US010270265B2

(12) United States Patent
Owen et al.

(10) Patent No.: US 10,270,265 B2
(45) Date of Patent: Apr. 23, 2019

(54) CONTROLLING BATTERIES FOR ELECTRIC BUS

(71) Applicant: New Flyer Industries Canada ULC, Winnipeg (CA)

(72) Inventors: Robert Brydon Thomas Owen, Winnipeg (CA); David Glen Naylor, Winnipeg (CA)

(73) Assignee: New Fryer Industries Canada ULC, Winnipeg, Manitoba (CA)

( * ) Notice: Subject to any disclaimer, the term of this patent is extended or adjusted under 35 U.S.C. 154(b) by 0 days.

(21) Appl. No.: 15/651,137

(22) Filed: Jul. 17, 2017

(65) Prior Publication Data

US 2017/0317508 A1    Nov. 2, 2017

Related U.S. Application Data

(63) Continuation of application No. 14/503,935, filed on Oct. 1, 2014, now Pat. No. 9,748,777.
(Continued)

(51) Int. Cl.
*H02J 7/00* (2006.01)
*B60L 1/06* (2006.01)
(Continued)

(52) U.S. Cl.
CPC ............ *H02J 7/0021* (2013.01); *B60L 1/06* (2013.01); *B60L 1/14* (2013.01); *B60L 3/0046* (2013.01); *B60L 3/0069* (2013.01); *B60L 3/04* (2013.01); *B60L 3/12* (2013.01); *B60L 11/1803* (2013.01); *B60L 11/185* (2013.01);
(Continued)

(58) Field of Classification Search
USPC ................................. 320/124, 125, 128, 135
See application file for complete search history.

(56) References Cited

U.S. PATENT DOCUMENTS 3,816,807 A *  6/1974  Taylor .................... H02J 7/008
                                                    320/139
5,291,388 A    3/1994  Heinrich
(Continued)

FOREIGN PATENT DOCUMENTS

WO    WO2011121052 A1    10/2011

OTHER PUBLICATIONS

Office Action dated Jun. 15, 2016 in U.S. Appl. No. 14/503,935.
(Continued)

*Primary Examiner* — Samuel Berhanu
(74) *Attorney, Agent, or Firm* — Dickinson Wright PLLC

(57) ABSTRACT

An onboard charging system for an electric vehicle is configured to communicate with a power supply through exchange of control signals on a power supply line by modulating a charging current being supplied to the charging system. The charging system is capable of communicating fault and battery parameter data to the power supply, as well as a requested charging current used to regulate the power supply output. The power supply may convert high voltage AC power into a controllable DC output supplied directly to the electric vehicle, thereby providing a convenient means for the vehicle to initiate charging during operations. Connection between the electric vehicle and the power supply may be effected using an extendible and retractable electrical connection, such as a mechanical pantograph.

25 Claims, 10 Drawing Sheets

Related U.S. Application Data

(60) Provisional application No. 61/970,486, filed on Mar. 26, 2014.

(51) Int. Cl.

| | | |
|---|---|---|
| *B60L 1/14* | (2006.01) | |
| *B60L 3/00* | (2019.01) | |
| *B60L 3/04* | (2006.01) | |
| *B60L 3/12* | (2006.01) | |
| *B60L 11/18* | (2006.01) | |

(52) U.S. Cl.
CPC ....... *B60L 11/1816* (2013.01); *B60L 11/1824* (2013.01); *B60L 11/1837* (2013.01); *B60L 11/1846* (2013.01); *B60L 11/1861* (2013.01); *B60L 11/1864* (2013.01); *H02J 7/0013* (2013.01); *B60L 2200/18* (2013.01); *B60L 2210/10* (2013.01); *B60L 2210/30* (2013.01); *B60L 2240/486* (2013.01); *B60L 2240/547* (2013.01); *B60L 2240/549* (2013.01); *B60L 2240/62* (2013.01); *B60L 2240/80* (2013.01); *B60L 2250/10* (2013.01); *B60L 2250/12* (2013.01); *B60L 2250/16* (2013.01); *H02J 7/0008* (2013.01); *Y02T 10/7005* (2013.01); *Y02T 10/7044* (2013.01); *Y02T 10/7055* (2013.01); *Y02T 10/7061* (2013.01); *Y02T 10/7072* (2013.01); *Y02T 10/7216* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/169* (2013.01); *Y04S 30/14* (2013.01)

(56) References Cited

U.S. PATENT DOCUMENTS

| | | | |
|---|---|---|---|
| 5,293,947 A | 3/1994 | Stratton | |
| 5,365,153 A | 11/1994 | Fujita et al. | |
| 5,422,558 A * | 6/1995 | Stewart | H02J 7/0021 320/120 |
| 5,438,250 A * | 8/1995 | Retzlaff | H02J 7/0019 320/128 |
| 5,504,414 A | 4/1996 | Kinoshita | |
| 5,703,464 A * | 12/1997 | Karunasiri | B60L 3/0046 180/65.8 |
| 5,734,253 A | 3/1998 | Brake | |
| 5,808,442 A | 9/1998 | Kaite | |
| 5,818,200 A * | 10/1998 | Cummings | H01M 10/4257 320/116 |
| 5,825,155 A * | 10/1998 | Ito | G01R 19/16542 320/118 |
| 6,021,052 A | 2/2000 | Unger et al. | |
| 6,023,137 A | 2/2000 | Kumar et al. | |
| 6,184,660 B1 * | 2/2001 | Hatular | H02J 7/022 320/139 |
| 6,879,134 B2 * | 4/2005 | Stanesti | H02J 7/0018 320/135 |
| 7,185,591 B2 | 3/2007 | Kumar et al. | |
| 7,690,456 B2 | 4/2010 | Deng et al. | |
| 7,733,039 B2 | 6/2010 | Su | |
| 7,839,121 B2 * | 11/2010 | Kim | H02J 7/0024 320/124 |
| 7,960,857 B2 | 6/2011 | King | |
| 8,008,876 B2 | 8/2011 | Yonemori et al. | |
| 8,030,884 B2 | 10/2011 | King et al. | |
| 8,907,597 B2 * | 12/2014 | Kim | B60L 11/1853 318/139 |
| 9,246,337 B2 * | 1/2016 | Iwasawa | G01R 31/3679 |
| 9,315,111 B1 | 4/2016 | McGrath | |
| 9,321,366 B1 | 4/2016 | Simonini | |
| 9,352,635 B1 | 5/2016 | Schepmann | |
| 9,423,465 B1 | 8/2016 | Watts | |
| 9,496,730 B2 | 11/2016 | Gallegos et al. | |
| 9,496,735 B2 | 11/2016 | Sarkar | |
| 9,669,719 B1 | 6/2017 | Gerber et al. | |
| 9,748,777 B2 | 8/2017 | Owen | |
| 9,776,520 B2 | 10/2017 | Shah | |
| 2004/0257043 A1 * | 12/2004 | Takaoka | H02J 7/0029 320/132 |
| 2004/0263118 A1 * | 12/2004 | Breen | H02J 7/0013 320/116 |
| 2006/0250902 A1 | 11/2006 | Bender et al. | |
| 2008/0100263 A1 * | 5/2008 | Nagatsuka | H01M 10/44 320/124 |
| 2008/0278114 A1 * | 11/2008 | Maegawa | H01M 10/4207 320/128 |
| 2010/0013438 A1 | 1/2010 | Anwar et al. | |
| 2010/0025131 A1 | 2/2010 | Gloceri et al. | |
| 2010/0225258 A1 | 9/2010 | Namuduri et al. | |
| 2011/0031051 A1 | 2/2011 | George | |
| 2011/0089887 A1 | 4/2011 | Ward | |
| 2011/0100735 A1 | 5/2011 | Flett | |
| 2011/0198141 A1 | 8/2011 | Clark et al. | |
| 2012/0306445 A1 * | 12/2012 | Park | B60S 5/06 320/109 |

OTHER PUBLICATIONS

Response filed Oct. 17, 2016 in U.S. Appl. No. 14/503,935.
Office Action dated Jan. 24, 2017 in U.S. Appl. No. 14/503,935.
Response filed Mar. 23, 2017 in U.S. Appl. No. 14/503,935.
Notice of Allowance dated Apr. 10, 2017 in U.S. Appl. No. 14/503,935.
Ki-Man Kim et al.; Mode Change Method of Bi-directional DC/DC Converter for Electric Vehicle; 8th International Conference on Power Electronics—ECCE Asia; School of Information and Communication Engineering; May 30-Jun. 3, 2011, The Shilla Jeju, Korea; pp. 2687 to 2693.
Mehran Ahmadi, et al; New Fully Soft Switched Bi-directional Converter for Hybrid Electric Vehicles: Analysis and Control; 2010 IEEE; Isafan University of Tehnology, Isfahan, Iran; University of Seville, Seville, Spain; pp. 2340 to 2345.
Xie Hui, et al; The Study of Plug-In Hybrid Electric Vehicle Power Management Strategy Simulation; TianJin University State Key Lab of Engines, Tianjin, Peoples R China; Sep. 3-5, 2008; 3 pages.
www.greenbix.com; Tilde Herrera; GreenBiz; IBM; Electric Buses Plug Into US Market with New Models, More Bucks; Oct. 25, 2011; pp. 1 to 3.
Wikipedia; Battery Electric Vehicle; Nov. 5, 2012; pp. 1 to 5.
www.proterra.com: Proterra Inc; About EcoRide TM BE35; Dec. 28, 2011; pp. 1 to 2.
www.proterra.com; Proterra, Inc.; Proterra-fast-charge-image; Dec. 28, 2011; p. 1.
www.proterra.com; Proterra, Inc.; About the FastFill™ Charging Station; Dec. 28, 2011; pp. 1 to 2.
www.proterra.com; Proterra, Inc.; About the TerraVolt Energy Storage Systems; Dec. 28, 2011; pp. 1 to 2.
Wikipedia; Azure Transit Connect Electric; Nov. 5, 2012; 3 pages.
Wikipedia; Electric Bus; May 11, 2012; 8 pages.
www.pluginamerica.org; Plug-in Vehicle Tracker; Nov. 5, 2012; 24 pages.
www.byd.com; Electric Bus; Nov. 6, 2012; 4 pages.
Wikipeida.org; Electric motorcycles and scooters; Nov. 5, 2011; 5 pages.

* cited by examiner

CONTROLLING BATTERIES FOR ELECTRIC BUS

CROSS-REFERENCE TO RELATED APPLICATIONS

This application is a continuation of U.S. application Ser. No. 14/503,935, filed Oct. 1, 2014, which claims the benefit of U.S. provisional application Ser. No. 61/970,486, filed Mar. 26, 2014, the entire contents of each of which are herein incorporated by reference.

TECHNICAL FIELD

The disclosure relates generally to systems and methods for charging, drawing power from, and otherwise managing or controlling energy storage device(s) and use thereof and, more particularly, to systems and methods for in-service or other management and control of energy storage device(s) installed on transit vehicles.

BACKGROUND

Various types of transit and other passenger vehicles, including various types of passenger buses, incorporate drive systems that are at least partially powered by electric energy. Drive systems in such vehicles, which may be fully electric or hybrid electric-combustion (generally referred to herein as an "electric vehicle"), will typically include one or more traction motors used to propel the vehicle. To provide energy for the vehicle drive system, as well as other on-vehicle electrical loads, such as onboard computers, navigation systems, and so on, such electric vehicles will also typically be equipped with one or more on-board batteries or other storage devices for electric energy. Such batteries or other storage devices are typically rechargeable so that it is not necessary, each time an old battery is depleted through usage, to remove the depleted battery and install a new battery.

In operating such electric vehicles, it can be important to rapidly, safely, and efficiently recharge wholly- or partially-depleted energy storage devices. For example, the range of an electric vehicle can be significantly extended by providing on-route charging stations, so that during passenger pickup/drop-off operations or other stops, such as route timing stops intended to allow a transit vehicle to maintain a proper schedule, the vehicle's charge may be wholly or partially restored. Because it is typically desirable that such vehicles be kept in generally moving operation as constantly as possible while deployed on a route, it can be important, during such stops, that any full or partial recharging be accomplished rapidly; yet any such charging should also be accomplished safely and efficiently.

In other cases, it can also be important during less hurried charging operations, such as those which can take place when a vehicle is not deployed to a route or otherwise is out of service, e.g., is 'off duty' for the night, to control charging operations so that batteries and other energy storage devices are safely and efficiently charged.

It can also be important in some situations to manage the manner in which power is drawn from batteries used in such buses, as for example when drawing power from the batteries to drive the traction motors so as to place the vehicle in motion, or to suitably control the motion of the vehicle, or when otherwise adding to or managing existing loads connected across the batteries.

There is room for improvement in, or development of useful alternatives to, any or all of these, and other, aspects of electric vehicle operation.

SUMMARY

In its various aspects, embodiments of the invention address the above and other aspects of charge management for electric vehicles.

For example, in one aspect the invention provides charge management systems for energy storage devices, the systems configured to monitor one or more parameters indicative of respective states of charge in each of a plurality of energy storage devices, such as batteries, of a wholly- or partially-electrically powered vehicle, such as a transit or other passenger bus, and to control a charge current supplied to, and/or a load current drawn from, the one or more energy storage devices based on the monitored parameter(s).

For example, according to one or more embodiments of such aspects, the invention provides a charge management or control system for one or more energy storage devices, the charge control system comprising a power supply line, a charge controller, and a communication subsystem. The power supply line is connectable to a power supply, such as an off-board generator or electrical power source, to transmit a charge current to the one or more energy storage devices. The charge controller can be configured to monitor any one or more of a wide variety of parameters indicative of respective states of charge in the one or more energy storage devices, and to control the charge current supplied to the energy storage devices based on the one or more monitored parameters. The communication subsystem can be coupled to the power supply line and the charge controller, and configured to receive control signals generated by the charge controller for transmission to the power supply and to modulate the charge current on the power supply line according to the control signals received from the charge controller.

In the same and other embodiments of such aspects, such charge control system can be configured to monitor any of one or more of such charge state parameters, and to control current(s) drawn from the energy storage devices based on the one or more monitored parameters. Such current(s) can be used to power traction motors and other loads on a vehicle, such as air conditioning, heating, lighting, and other environmental or onboard control systems.

In these and other aspects of the invention, a communication subsystems in accordance with the invention can be configured to detect charge current modulations on the power supply line, the charge current modulations representing control signals generated by the power supply; and to generate control signals for execution by the charge controller based on one or more characteristics of the detected charge current modulations. For example, in such embodiments the charge current can comprise both a direct current (DC) component and an alternating current (AC) component. The DC component can correspond to a charging current for the one or more energy storage devices, supplied by the power supply in response to the control signals generated by a charge controller. The AC component can correspond to modulations of the charge current representing control signals transmitted over the power supply line.

In various further aspects, the invention provides methods of controlling charging and/or power draw-down processes for energy storage devices such as batteries. Such methods are suitable for use in conjunction with, for example, charge management or control systems as described herein, and comprise various methods of controlling the sequence(s) and other characteristics of connecting batteries and/or other energy storage devices to charge and/or load circuits, including pluralities of energy storage devices that have been grouped, for charging and/or current-supply purposes, in various ways and according to various criteria. In various embodiments, such methods can be used effectively to improve any or all of safety, efficiency, and rapidity of charging.

In one such aspect, the invention provides methods which include supplying a charging current to a first grouping of a plurality of energy storage devices, each grouping comprising one or more energy storage devices currently connected to a power supply line; selecting one or more energy storage devices for connection to the power supply line from a second grouping of the energy storage devices comprising one or more energy storage devices not currently connected to the power supply line; and connecting the selected energy storage device(s) to the power supply line when it is determined that a group voltage of the one or more energy storage devices in the first grouping and the voltage of the energy storage device selected from the second grouping are within a specified maximum difference of each other.

In another such aspect, the invention provides methods which include connecting one or more loads to a first grouping of a plurality of energy storage devices, each grouping comprising one or more energy storage devices currently connected to a power supply line; selecting one or more energy storage devices for connection to the power supply line from a second grouping of the energy storage devices comprising one or more energy storage devices not currently connected to the power supply line; and connecting the selected energy storage device(s) to the power supply line when it is determined that a group voltage of the one or more energy storage devices in the first grouping and the voltage of the energy storage device selected from the second grouping are within a specified maximum difference of each other.

As a further example, the invention provides methods of charging pluralities of energy storage devices, the methods including connecting an initial grouping of the energy storage devices to a power supply line, the initial grouping comprising one or more energy storage devices determined to have respective voltages within a specified maximum difference of each other; and until each of the plurality of energy storage devices is connected the power supply line, iteratively: charging the initial grouping of the energy storage devices with a charging current supplied to the power supply line; selecting a next grouping of the energy storage devices for connection to the power supply line, the next grouping comprising one or more energy storage devices not yet connected to the power supply line determined to have respective voltages within the specified maximum difference of each other; and connecting the next grouping of the energy storage devices to the power supply line when it is determined that a group voltage of the one or more energy storage devices in the first grouping currently connected to the power supply line and the voltage of a respective energy storage device in the next grouping, for each energy storage device in the next grouping, are within the specified maximum difference of each other; and discontinuing supply of the charging current to the power supply line when it is determined that the plurality of energy storage devices are charged to a specified full charge voltage.

As a further example, the invention provides methods of drawing power from pluralities of energy storage devices, the methods including connecting an initial grouping of the energy storage devices to a power supply line connected to one or more loads, the initial grouping comprising one or more energy storage devices determined to have respective voltages within a specified maximum difference of each other; and until each of the plurality of energy storage devices is connected the power supply line, iteratively: drawing power from the initial grouping of the energy storage devices to provide a power current supplied to the load(s); selecting a next grouping of the energy storage devices for connection to the power supply line and load, the next grouping comprising one or more energy storage devices not yet connected to the power supply line determined to have respective voltages within the specified maximum difference of each other; and connecting the next grouping of the energy storage devices to the power supply line when it is determined that a group voltage of the one or more energy storage devices in the first grouping currently connected to the power supply line and the voltage of a respective energy storage device in the next grouping, for each energy storage device in the next grouping, are within the specified maximum difference of each other; and optionally discontinuing supply of the power current to the load(s) when it is determined that the plurality of energy storage devices are drawn down to a specified minimum charge state.

As a further example, the invention provides methods of charging pluralities of energy storage devices, the methods including connecting an initial grouping of the energy storage devices to a power supply line, the initial grouping comprising one or more energy storage devices determined to have respective voltages within a specified maximum difference of each other; supplying a charging current to the power supply line; connecting a remainder of the energy storage devices not included in the initial grouping to the power supply line by, for each respective energy storage device in the remainder, connecting the respective energy storage device to the power supply line when it is determined that a group voltage of the one or more energy storage devices currently connected to the power supply line and the voltage of the respective energy storage device in the remainder are within a specified maximum difference of each other; and discontinuing supply of the charging current to the power supply line when t is determined that the plurality of energy storage devices are charged to a specified full charge voltage.

As a further example, the invention provides methods of drawing power from pluralities of energy storage devices, the methods including connecting an initial grouping of the energy storage devices to a power supply line, the initial grouping comprising one or more energy storage devices determined to have respective voltages within a specified maximum difference of each other; supplying a load current to the power supply line for one or more loads; connecting a remainder of the energy storage devices not included in the initial grouping to the power supply line by, for each respective energy storage device in the remainder, connecting the respective energy storage device to the power supply line when it is determined that a group voltage of the one or more energy storage devices currently connected to the power supply line and the voltage of the respective energy storage device in the remainder are within a specified maximum difference of each other; and optionally discontinuing supply of the power current to the power supply line when it is determined that the plurality of energy storage devices are depleted to a specified charge state.

In any or all of such aspects of the invention, the one or more energy storage devices in one or more of the first and second groupings (and any subsequent groupings) can be connected in parallel to the power supply line; and subsequently connected energy storage devices such as those in the second groupings can be selected on the basis of having a lowest voltage (in the case of charging processes) or highest voltage (in the case of power draw processes) among the one or more energy storage devices.

Thus, such methods can comprise measuring one or more voltages associated with energy storage device(s) of the second grouping; determining the lowest voltage energy device in the second grouping based on comparison of the measured voltages; and optionally determining when to connect the selected energy storage device from the second grouping to the power supply line based on comparison of the monitored group voltage and the measured voltage of the selected energy storage device.

Similarly, such methods can comprise measuring one or more voltages associated with energy storage device(s) of the second grouping; determining the highest voltage energy device in the second grouping based on comparison of the measured voltages; and optionally determining when to connect the selected energy storage device from the second grouping to the power supply line based on comparison of the monitored group voltage and the measured voltage of the selected energy storage device.

As will be understood by those skilled in the relevant arts, once they have been made familiar with this disclosure, in further aspects the invention provides persistently-stored media comprising machine-readable coded instruction sets adapted to cause one or more controllers to execute such methods, using systems in accordance with the disclosure.

Further details of these and other aspects of the invention will be apparent to those skilled in the relevant arts from the detailed description of various embodiments provided below.

BRIEF DESCRIPTION OF THE DRAWINGS

Reference will now be made to the accompanying drawings, in which:

FIGS. 10A and 18B show front and perspective views of an embodiment of a vehicle comprising an energy storage device engaging an interface of a power supply, in accordance with the invention.

For clarity and ease of description, like reference numerals will be used in the drawings to describe the same or like parts.

DETAILED DESCRIPTION

Figure 1:
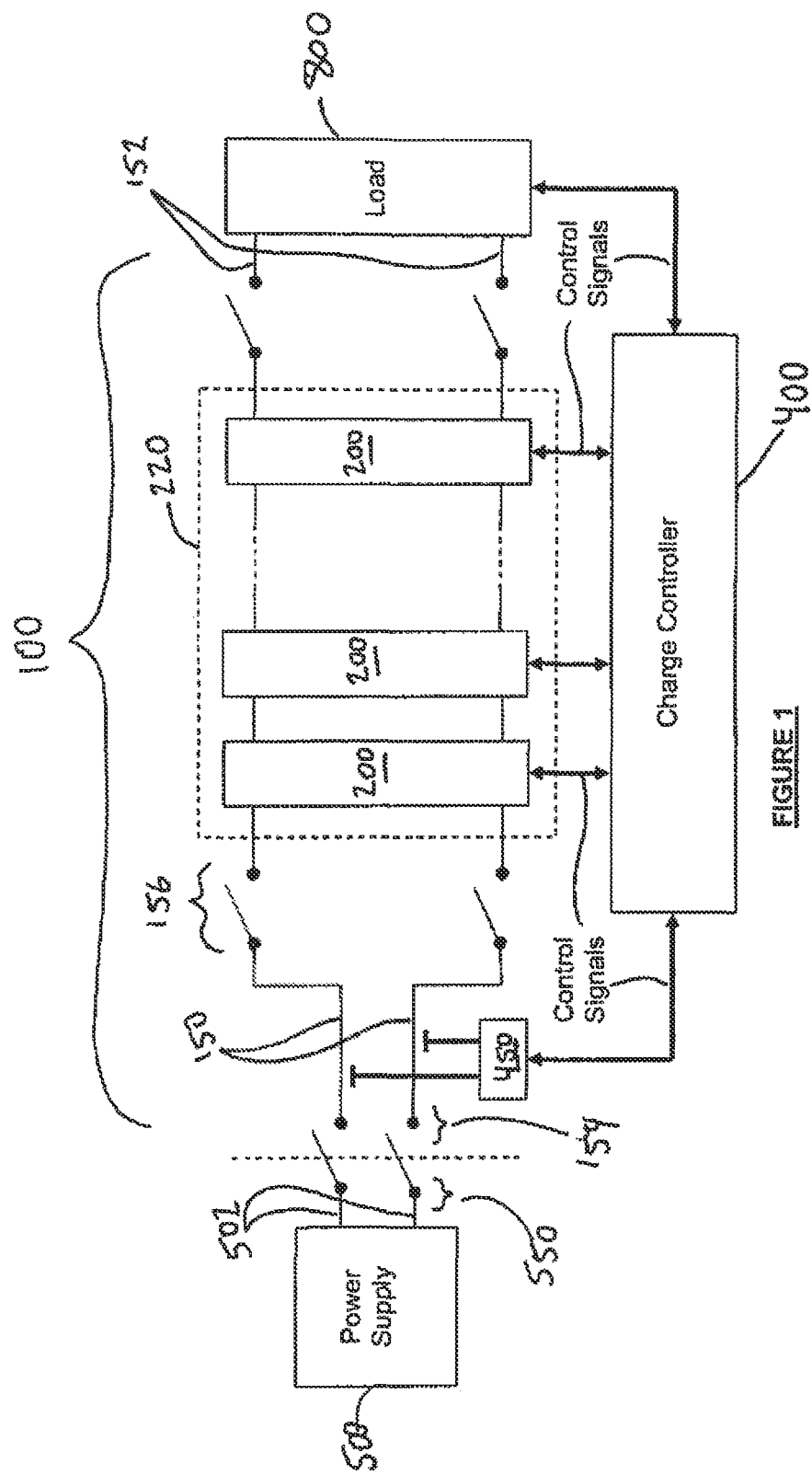
FIG. 1 is a schematic diagram showing an embodiment of a charge control system in accordance with the invention, and components with which might act in operation.

Some electric vehicles may be equipped with a number (e.g., more than one) of on-board batteries, for example, which can be provided in multiple groupings, in one or more separate locations on the vehicle, for reasons of efficiency in operation of on-board electrical systems, safety, power capacity, and weight distribution. In such cases, the one or more on-board energy storage devices may be parallel-connected to a central bus or power distribution line that leads to the vehicle drive train and other electrical loads, such as the vehicle on-board electrical system(s).

Use of multiple, parallel-connected battery banks or strings can, in some cases, allow for the use of off-the-shelf battery packs in order to meet overall voltage, current, and/or power requirements. For example, individual battery packs of a certain capacity may be series connected within a bank or string in different numbers so as to meet an operating voltage requirement, while banks or strings (containing such series-connected battery packs) may themselves be parallel connected in different numbers so as to meet operating current requirements. Such arrangements of battery packs and banks/strings in order to meet current and/or voltage requirements may thereby also achieve an overall power requirement for the vehicle. Of course, other arrangements and/or connections of batteries in a vehicle are possible as well.

In other cases, use of multiple parallel-connected battery banks or strings may also introduce a measure of resiliency or redundancy to the electrical drive system of an electric vehicle. During operation, for example, a battery or storage device may experience a fault or other performance irregularity that requires the battery to be powered down or de-energized. If an electric vehicle is equipped with only a single battery, such a fault or performance irregularity could require the only energy source for the vehicle drive system to be taken offline, which would result in the entire vehicle effectively ceasing operation. However, by providing a vehicle with multiple, physically isolated energy sources, faults in one or more individual batteries would not necessarily force complete shutdown of the vehicle because affected batteries could be individually disconnected from the vehicle drive system with unaffected batteries remaining online.

Thus, it will be apparent that there are many benefits and/or advantages to equipping electric vehicles, such as transport buses, with multiple energy sources for the vehicle drive and other onboard electrical system(s).

However, the existence of multiple different batteries within an electric vehicle may require a central battery management or controller in order to coordinate operation of the various different onboard batteries, including charging and discharging, as well as fault detection, during operation. For example, when a vehicle drive system is requesting a certain total power output, individual controllers for each respective energy storage device supplying the drive system may only be configured to control the power output of that particular battery and may not have information pertaining to the power output of other batteries. Thus, in such cases, a central controller may be employed in order to allocate the total requested power output across each of the operational batteries in order to satisfy the total power output requested by the vehicle drive system.

Likewise, during charging operations, a controller for an individual battery may only be configured to request a charging current required by that particular battery and may not have information about charging currents being requested by other batteries. A central controller again may be employed in order to coordinate operation of the multiple different batteries, in this case, by aggregating the charging currents requested by individual batteries into a total charging current to be supplied by a suitable power supply. In this scenario, the power supply may then receive only such total charging current request (as opposed to multiple charging current requests for individual batteries) and attempt to deliver current at the requested level, thereby simplifying the number and/or configuration of control connections between the power supply and the charge controller.

The parallel connection of high-voltage batteries, such as the various banks or strings that may be employed in electric vehicles, also has the potential to create large voltage spikes and/or inrush currents if connection parameters are not controlled. For example, such voltage spikes and/or inrush currents may be generated if high-voltage batteries have greatly mismatched terminal voltages at the time of connection. Any voltage spikes or inrush currents that are generated may, in some cases, damage the batteries. Thus, a centralized battery controller may also be employed in order to control or manage connection and disconnection of individual batteries to the onboard electrical load(s) in a way so as to avoid or minimize of the effects of terminal voltage mismatch.

Various embodiments of charge systems and associated methods for energy storage devices equipped on transit vehicles, including at least one preferred embodiment, will now be described with reference to the drawings.

Reference is initially made to FIG. 1, which shows an embodiment of a charge control system 100, situated within an example operational environment, in accordance with the invention. Thus, control system 100 is shown together with one or more additional modules or components with which system 100 might interact while in operation. In the embodiment shown, the control system 100 is carried on-board an electric vehicle, such as a public transit vehicle, and is adapted for connection to each of a power supply 500, which can be external to the vehicle, and an onboard electrical load 800, which may be or include a vehicle power drive train and associated electrical system(s) for the vehicle.

In the embodiment shown in FIG. 1, charge control system 100 comprises a power supply line 150, a charge controller 400, and a communication subsystem 450, and may operate so as to control both charging and discharging of a plurality 220 of parallel-connected energy storage devices 200. Such energy storage devices 200 may serve as the onboard energy source(s) for an electric vehicle and, therefore, may be used in operation to drive load(s) 800 and may be re-chargeable by power supply 500. The number of energy storage devices 200 is variable, but generally may comprise two or more separate devices; however, in various different embodiments, up to six or more individual energy storage devices 200 can be included in charge control system 100. As explained further below, each individual energy storage device 200 may be connectable to (and dis-connectable from) power supply line 150 by means of a suitable power electronic or other type of switch or connection.

Power supply line 150 is connectable to the power supply 500 by means of plugs, switches, or other releasable connections 550, 154, 156, and to load(s) 800 by means of plugs, switches, or other releasable connections 152, in order to enable the power supply line 150 for either charging or discharging of one or more of the plurality 220 of batteries or other energy storage devices 200. Thus, when connections 550, 154 and 156 are closed (connection 152 may be open at this point so as to isolate or disconnect load(s) 800 from system 100), the plurality 220 of energy storage devices may be connected to power supply 500, which thereby generates or otherwise provides a charge current to recharge the energy storage device(s) 200. Alternatively, when connections 550, 154 and 156 are opened and connection 152 is closed, power supply line 150 may provide an electrical connection between the plurality 220 of energy storage devices 200 and load(s) 800, which thereby enables such energy storage devices 200 to provide load(s) 800 with a power or drive current, for example, in order to power a drive system of a transit or other vehicle.

In some embodiments, charge control system 100 may be configured to provide controlled charging of energy storage devices 200 by making use of bilateral communication(s) exchanged between charge control system 100 and power supply 500, advantageously carried out across the same transmission line, e.g., power supply line 150, which power supply 500 uses to deliver the charging current to energy storage devices 200. Thus, a single connection or set of connections can be made between power supply 500 and charge control system 100 that is used both for energy transfer and exchange of appropriately configured control signals.

Such dual-purpose connection(s) may advantageously facilitate the process of expedient coupling and de-coupling of control system 100 (which is on-board an electric vehicle) and power supply 500 (which can be external to the electric vehicle), thereby making the electric vehicle more conducive to charging while in operation. For example, use of separate control connections for the purpose of exchanging control signals, although possible, may be impractical or inconvenient due to associated difficulties with proper alignment of internal connections on the vehicle and external connections in the power supply to which the vehicle is attempting to connect. By exchanging control signals on the same power transmission line as is employed for power delivery instead, the number of physical connections between a vehicle and external power supply may be reduced, while the size of such connections may generally be increased. Example embodiments of suitable mechanical connections are described below with reference to FIGS. 10A and 10B.

Accordingly, in some embodiments, charge controller 400 comprises any one or more signal generators and data processor(s) and/or other signal processing devices suitable for use in monitoring one or more parameters indicative of respective states of charge in the one or more energy storage devices 200, and to control the total charge current provided by power supply 500 via power supply lines 150 for the one or more energy storage devices 200, and/or current provided by energy storage device(s) 200 to load(s) 800, based on the monitored parameters. Such controllers can, for example, include one or more data processors capable of accessing and executing suitably-coded instruction sets stored in persistent media such as digital memory devices, to generate suitably-configured control signals to be used in modulating currents in power supply line 150 for use by various other components of the system 100, 500, 800, 900 as described herein.

Charge controller 400 may also be provided with a plurality of control connections comprising one connection, respectively, to each of the plurality of energy storage devices 200. Each individual storage device 200 may therefore communicate respective parameters for that storage device 200 to charge controller 400, wherein such parameters may be aggregated into overall parameters for the plurality 220. Thus, for example, during a charging operation, charge controller 400 may determine an overall charging current to be requested as an aggregate of individual charge currents requested from each of the storage devices 200 respectively. Likewise, charge controller 400 may also communicate individual control signals to respective energy storage devices 200 using the different control connections. Thus, for example, during a discharge cycle, charge controller 400 may allocate individual power outputs to each storage device 200 based on an overall power output requested from load(s) 800.

Figure 2:
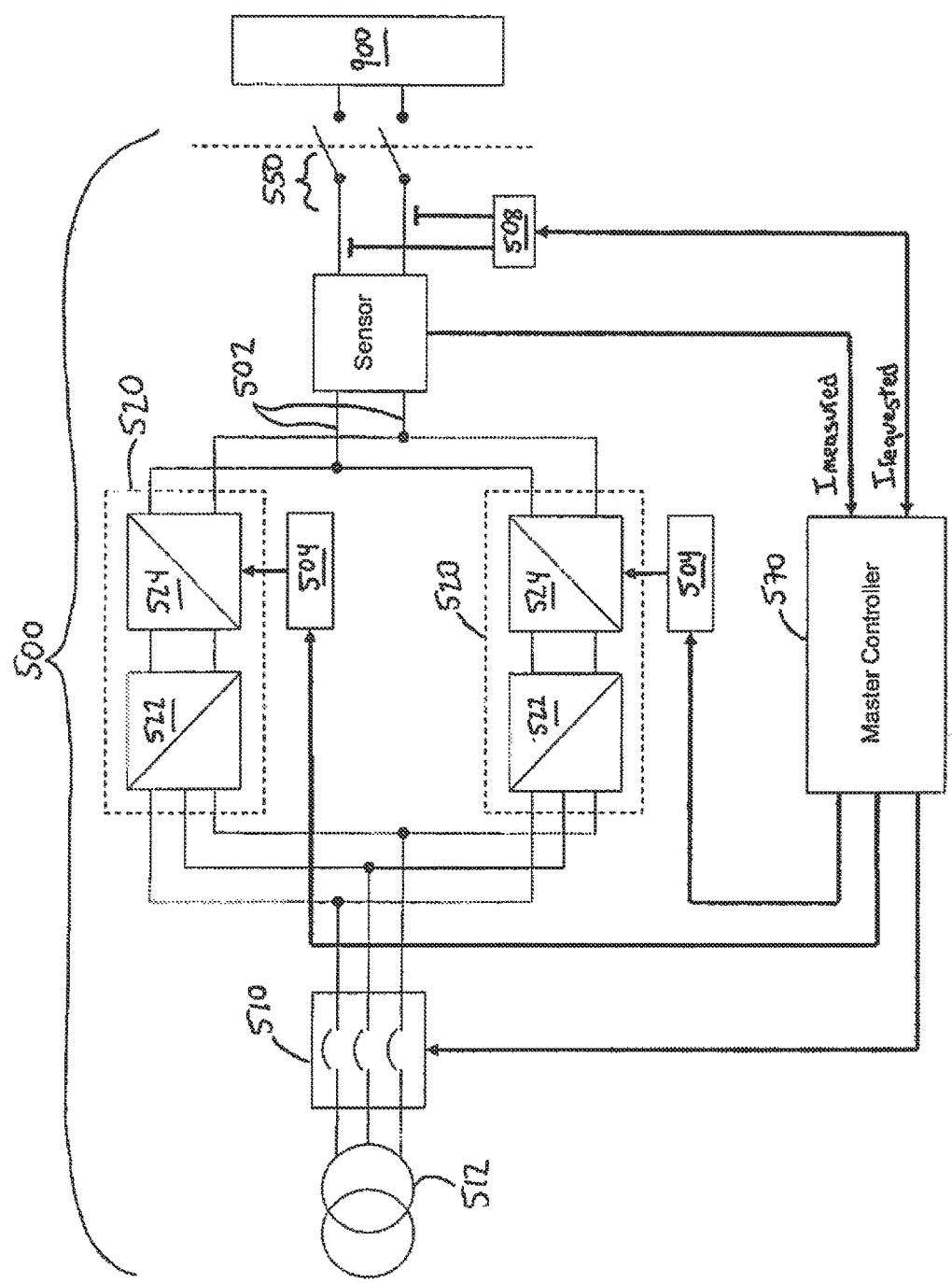
FIG. 2 is a schematic diagram showing an embodiment of a power supply in accordance with the invention, and components with which might act in operation.

Communication subsystem 450 is coupled to the power supply line 150 and the charge controller 400, and is configured to receive control signals generated by the charge controller 400 for transmission to power supply 500, and to modulate the charge current on the power supply line 150 according to the control signals received from the charge controller 400. For example, communication subsystem(s) 450 can comprise any components, including signal processors, suitable for use in generating, translating, receiving, transmitting, and/or otherwise processing control signals intended to be executable by master control(s) 570 and/or communication subsystem(s) 508 (FIG. 2).

In some embodiments, communication subsystem 450 may also be configured to detect charge current modulations on the power supply line 150 that have been generated and transmitted to charge control system 100 by another component. For example, the modulations may represent control signals generated by power supply 500 for transmission to charge controller 400. Based on such detected charge current modulations on power supply line 150, communication subsystem 450 may be configured to generate control signals for execution by charge controller 400 or some other component of charge control system 100. Thus, by modulating the charge current according to control signals provided from charge controller 400, as well as decoding or demodulating signals detected on power supply line 150 for execution by charge controller 400, communication subsystem 450 provides a mechanism for enabling bilateral communication between charge control system 100 and power supply 500.

Different encoding and/or modulation schemes may be employed by communications subsystem 450 to effect communication with power supply 500. As explained below, the charge current transmitted on power supply 150 may generally be a DC or essentially DC signal. Communications subsystem 450 may therefore modulate such DC signal using one or more suitable frequency-domain modulation schemes, without limitation, including orthogonal frequency division multiplexing (OFDM) or binary phase shift keying (BPSK). In this way, control signals encoded into frequency domain symbols or waveforms may be superimposed onto (or extracted from) the generally DC charge current exchanged between power supply 500 and charge control system 100. Since the magnitude of the DC charge current may generally be large compared to the frequency domain modulations, the waveform of the total charge current may remain generally DC and, consequently, a generally efficient energy transfer may be achieve despite the presence of AC ended control signals.

As one example of operation of the control system 100, and explained more fully below, a charge controller 400 can monitor one or more parameters indicative of respective states of charge in the one or more energy storage devices 200, and generate control signals (converted into modulations on power supply line 150 by a communications subsystem 450) to be used by any of the components described herein, including for example communications subsystem(s) 508 and/or master control(s) 570 (FIG. 2) to control the charge current provided by power supply line 150 for the one or more energy storage devices 200, based on the monitored parameters. As explained further below, charge controller 400 may, for example, transmit a voltage or current magnitude request, which power supply 500 may then take as an input into a suitably configured feedback or other type of control loop so as to regulate an output voltage or current at the requested level.

When either fully or partially charged, energy stored by one or more storage devices 200 can be used to provide energy in, for example, the form of electric current, via power supply lines and switches 152 to one or more loads 800, such as drive motor(s), environmental control systems, and vehicle navigation and control systems, etc. The desired total energy output of energy storage device(s) 200 may be requested by load(s) 800, as noted, which charge controller 400 then allocate among the various energy storage devices 200 using individual control signals transmitted to such energy storage devices 200 accordingly.

In some embodiments, the desired total energy output of energy storage device(s) 200 may be requested through suitable control signals exchanged between load(s) 800 and charge controller 400. As charge controller 400 and load(s) 800 may generally be collocated onboard a transit vehicle, in various embodiments, such control signals may be exchanged between load(s) 800 and charge controller 400 by way of dedicated control paths without encoding or modulating a power signal (with use of a suitably configured communication subsystem 450, 508), as in the case of communications exchanged between a non-collocated charge controller 400 and power supply 500.

Referring now to FIG. 2, there is shown a schematic diagram of an example embodiment of a power supply 500, situated within an example operational context, in accordance with the invention, and components with which it might interact in operation. In the embodiment shown in FIG. 2, power supply 500 may be either situated either external or internal to an electric vehicle, and is adapted to operate in conjunction with an electric or other ac power source 700, such as the public electric power grid, a generator, and/or any other power source(s) compatible with the purposes disclosed herein. Also shown is an energy storage system 900, such as might be housed on an electric vehicle, such as a transit bus, to which power supply 500 may be configured to deliver power. For example, energy storage system 900 may comprise a plurality of energy storage devices 200, as shown in FIG. 1, together with a charge control system 100 with which power supply 500 may communicate through bilateral exchange of control signals.

In some embodiments, power supply 500 may be generally configured to generate a controllable DC output current and/or voltage based on one or more external requests, such as from charge control system 100, and a suitable source of high-voltage AC power, as noted, which can be the public utility grid. In such cases, one or more power converters may be utilized within power supply 500 in order to convert the source of AC power into a controllable DC output. By utilizing the public utility grid as a source of AC input, the possible location(s) of power supply(ies) 500 may be extended on account of the availability at different physical locations of access points into the public utility grid. For example, it may be possible to install a suitable power supply 500 at multiple different locations along the scheduled route of an electric transit vehicle.

Thus, as shown in FIG. 2, a power supply 500 may include connections 550 for releasably connecting the power supply 500 to the energy storage system 900; isolation transformer(s) 512 for coupling the power supply 500 to a source of ac input power; one or more master controls 570; voltage and/or current sensor(s) 506; communication subsystem(s) 508, circuit breaker(s) and/or other power switch(es) 510; and a plurality of power converters 520 with associated control(s) 504.

Connections 550 for releasably connecting the power supply 500 to the energy storage system 900 can comprise plug(s), switch(es), and/or other releasable connections consistent with the purposes disclosed herein, in view of any specific application(s) that can be made of power supply 500, e.g., charging of a transit or other passenger bus.

In some embodiments, circuit breaker(s) and/or other power switch(es) 510, and other components such as isolation transformer(s) 512, can be used to provide emergency power shut-off or other releasable connections to external sources, such as the utility power distribution grid. Circuit breakers and/or power switches 510 may be controllable in response to control signals generated by master controls 570.

Isolation transformer(s) 512 may be used to protect and condition the supply feed received from an external source of ac power, such as by translating the supply feed to voltage level(s) desired for use in power supply system 500 and/or other components, including charge control system 100. For example, the public utility grid may typically provide high voltage AC that isolation transformer(s) 512 may step down to more suitable levels for the purpose(s) and application(s) described herein.

Communication subsystem(s) 508 can be coupled to each of the power supply line 502 and the master control 570, and can be configured to detect and interpret modulated control signals transmitted on power supply line 502. For example, as described herein, charge current modulations may be generated and transmitted by communication subsystem 450 (responsive to charge controller 400) of charge control system 100 (FIG. 1) for transmission to power supply 500. Like communication subsystem 450, communication subsystem 508 may also be configured to generate charge current modulations on power supply line 502 for transmission of control signals to energy storage system 900. For example, such control signals may be generated by master controller 570 and provided to communication subsystem 508.

Control signals detected by communication subsystem 508 on power supply line 502 may be passed, in suitable form, to master control 570 for use in controlling one or more different components of power supply 500. For example, the control signals may contain directions for output current and/or voltage to be generated by power converter(s) 520 for transmission to energy storage system 900 on power supply line 502, e.g., for use in charging energy storage device(s) 200. Thus, in some embodiments, communication subsystem(s) 508 can comprise any components, including signal processors, suitable for use in generating, translating, receiving, transmitting, and/or otherwise processing control signals intended to be executable by any or all of master controls) 570, charge controller(s) 400, and communication subsystem(s) 450.

Voltage and/or current sensor(s) 506 can be coupled to power supply line(s) 502 and comprise any components suitable for use in generating and/or passing to master controller(s) 570 signals representing currents and/or voltages detected on the power supply line(s) 502 between converter(s) 520 and energy storage system 900. As described herein, such voltage and/or current measurements may be used by master controls 570 in a feedback or other suitable control loop in order to control or regulate the charge currents and/or voltages outputted by power supply 500.

Master control(s) 570 comprise any logical controllers and/or other signal processor(s) suitable for use in interpreting signals received by voltage and/or current sensor(s) 506 and communications subsystem(s) 508, and for generating signals useful for controlling currents and/or voltages output by power converter(s) 520. For example, as described herein, master control(s) 570 can compare one or more currents requested by an energy storage system 900 (as represented by signals received from one or more communications subsystems 450) with current(s) outputted by converter(s) 520 (as represented by signals received from voltage current sensor(s) 506) and, based on such comparison, generate signals useful in enabling associated control(s) 504 to cause converter(s) 520 to increase or decrease current and/or voltage outputs accordingly and thereby to regulate the output of power supply 500 in accordance with the requested level(s).

One or more power voltage/current converters 520 can comprise any components, or combinations of components, suitable for establishing and/or maintaining, under the control of master control(s) 570 and associated control(s) 504, desired currents and/or voltages in power supply line(s) 502. For example, as described herein, converter(s) 520 can comprise any desired types of alternating current-direct current (AC/DC) rectifiers, converters, and/or other devices. While a plurality of power converters 520 are shown in FIG. 2, in alternative embodiments, different numbers of power converters 520, including only a single converter 520, may be included. The number of power converters 520 may vary depending on the output power requirements of power supply 500, as will be appreciated.

In some embodiments, power converter(s) 520 may have a two-stage configuration comprising, as a first stage, AC-DC converter(s) 522 and, as a second stage, controllable DC-DC converter(s) 524 coupled to the output of AC-DC converter(s) 522. The AC-DC converter(s) 522 may have any suitable configuration, such as a three-phase bridge or rectifier, which is useful for converting the stepped down AC provide by isolation transformer 512 into an intermediate DC output. Converter(s) 524 may receive the intermediate DC output and, based on suitable control signals relayed by control(s) 504, convert the intermediate DC output to requested levels. For example, DC-DC converter(s) 524 may be implemented using configurations and combinations of buck and/or boost converters, or some other suitable type of power DC-DC converter, and output may be controlled by varying the converter duty cycle.

As will be readily apparent to those skilled in the relevant arts, once they have been made familiar with this disclosure, power supply(ies) 500 and charge control system(s) 100 in accordance with embodiments of the invention may be provided in any convenient or otherwise-desired location. For example, in an embodiment adapted for rapid charging at an on-route charging station 1001 (see for example FIGS. 10A and 10B described below), power supply 500 may be included in a charging station 1001, while charge control system 100 may be installed on a bus 1000, so that the charging station 1001 is, through power supply 500, able to provide converted grid power directly to the bus via pantograph(s) 1004. Alternatively, in some embodiments, one or more components of power supply 500 may be installed on bus 1000.

Figure 3:
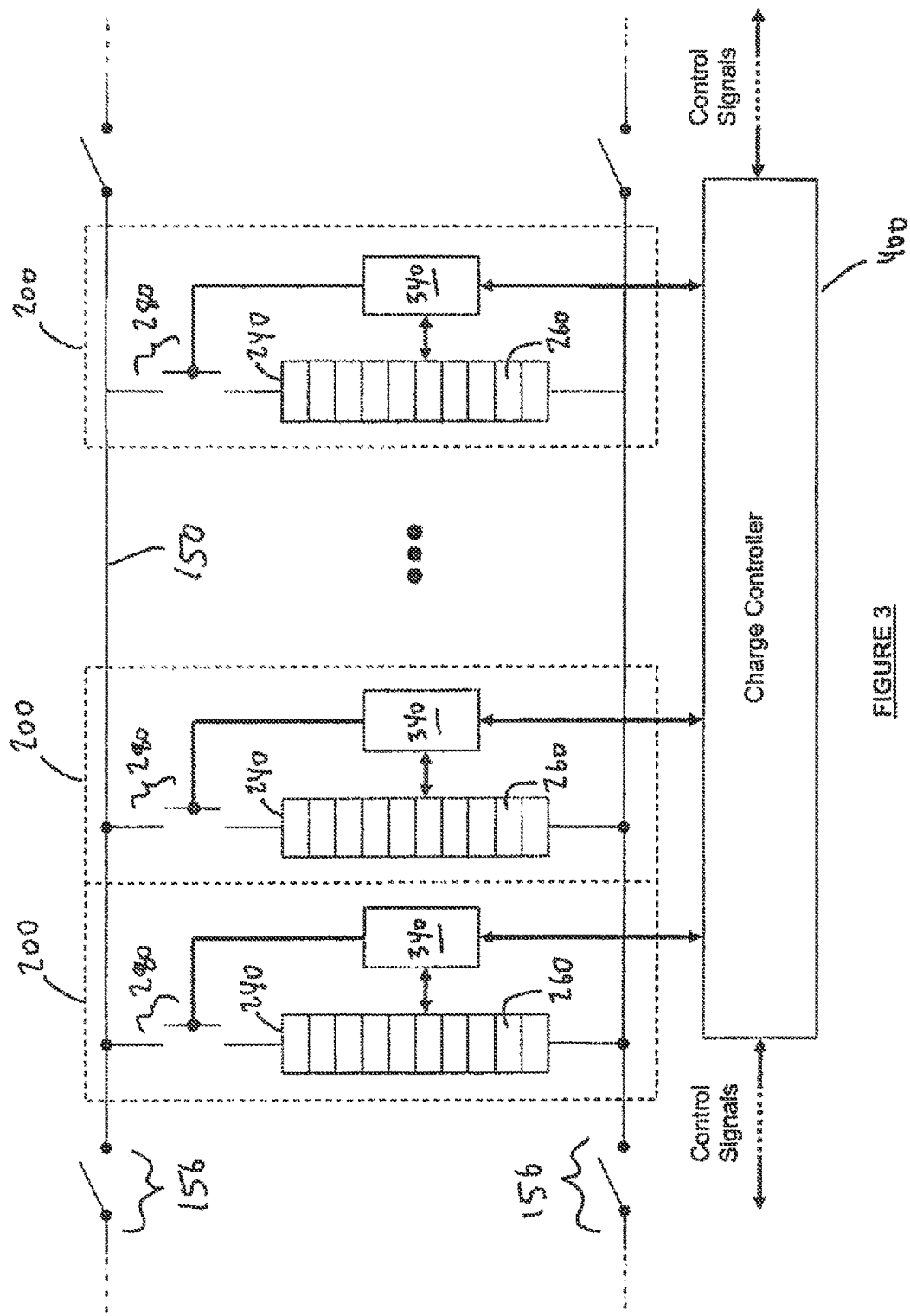
FIG. 3 is a schematic diagram showing embodiments of components of a charge control system in accordance with the invention.

Referring now to FIG. 3, there is shown a plurality 220 of energy storage devices 200 in more detail in accordance with the invention. As shown, plurality 220 may comprise two or more individual batteries or energy storage devices 200. In some embodiments, each individual storage device 200 may itself comprise a string 240 of two or more series-connected battery packs 260, an associated bank controller 340, and a disconnect switch 280. The number and configuration of storage devices 200 may be variable depending on voltage, current, and/or power requirements of the plurality 220 as well as for other reasons, such as desired redundancy, versatility, etc.

Each bank controller 340 may be configured to monitor state of charge parameters in the series-connected battery packs 260 of the energy storage device 200 in which the bank controller 340 is installed, and to control charging and/or discharging of the energy storage device 200 based on the monitored parameters. Thus, for example, bank controller 340 may be configured to determine a magnitude of a charging current or charging voltage required by the energy storage device 200, identify potential faults or other out-of-range operations, and to take corresponding responses, such as by breaking the connection to power supply line 150 by opening up disconnect switch 280, which may be a power electronic switch, an electromechanical switch, or some other configuration of switch.

The plurality of bank controllers 340 may also in some embodiments be coupled to charge controller 400 to thereby exchange control parameters and other commands. For example, each bank controller 340 may transmit a corresponding current/voltage request for the associated energy storage device 200 (based on the monitored state of charge parameters) to the charge controller 400, wherein the individual requests are aggregated into a total current/voltage request for the plurality 220 of storage devices 200. Given a charge current/voltage on power supply line 150, the individual charge controllers 340 may then be responsible for control of charging in corresponding individual energy storage devices 200, such as by continuing to monitor state of charge parameters, relaying new charge current requests to charge controller 400, and ensuring that the energy store device 200 draws the requested current, as well as by opening and/or closing of disconnect switch 280. As described further below, charge controller 400 can control the timing of such connections and/or disconnections based on monitored state of charge parameters.

During discharge, individual bank controllers 340 may also be responsible for controlling the power output of a given energy storage device 200. For example, each bank controller 340 may receive a power output request from charge controller 400 (which can be an allocated portion of a total power output request for the plurality 220 of energy storage devices 200) and can control the associated energy storage device 200 to provide the requested output. Bank controller 340 may achieve such control using different mechanisms, such as current limiters and other forms of output control, as well as by connecting and/or disconnecting the energy storage device 200 from power supply line 150 using the disconnect switch 280. As described further below, charge controller 400 can control the timing of such connections and/or disconnections based on monitored state of charge parameters.

Configurations of charge control system 100 (FIG. 1) and power supply 500 (FIG. 2) as described herein may communicate with each other, through exchange of control signals, in order to control charging of energy storage devices 200. In addition to controlling parameters of charging current(s) and/or voltage(s) supplied to energy storage devices 900, charge control system 100 and power supply 500 may, through exchange of control signals, implement further aspects of charging operations, such as handshaking to establish and verify connection(s), and/or use of control or override signals so as to control the timing and sequence of charging operations, as well as the detection of battery faults or other conditions in response to which shutdown or other remedial measures may be taken. Such charging operations are described further below with reference to FIGS. 4-9, which are process flow diagrams showing embodiments of various aspects of methods in accordance with the invention.

Figure 4:
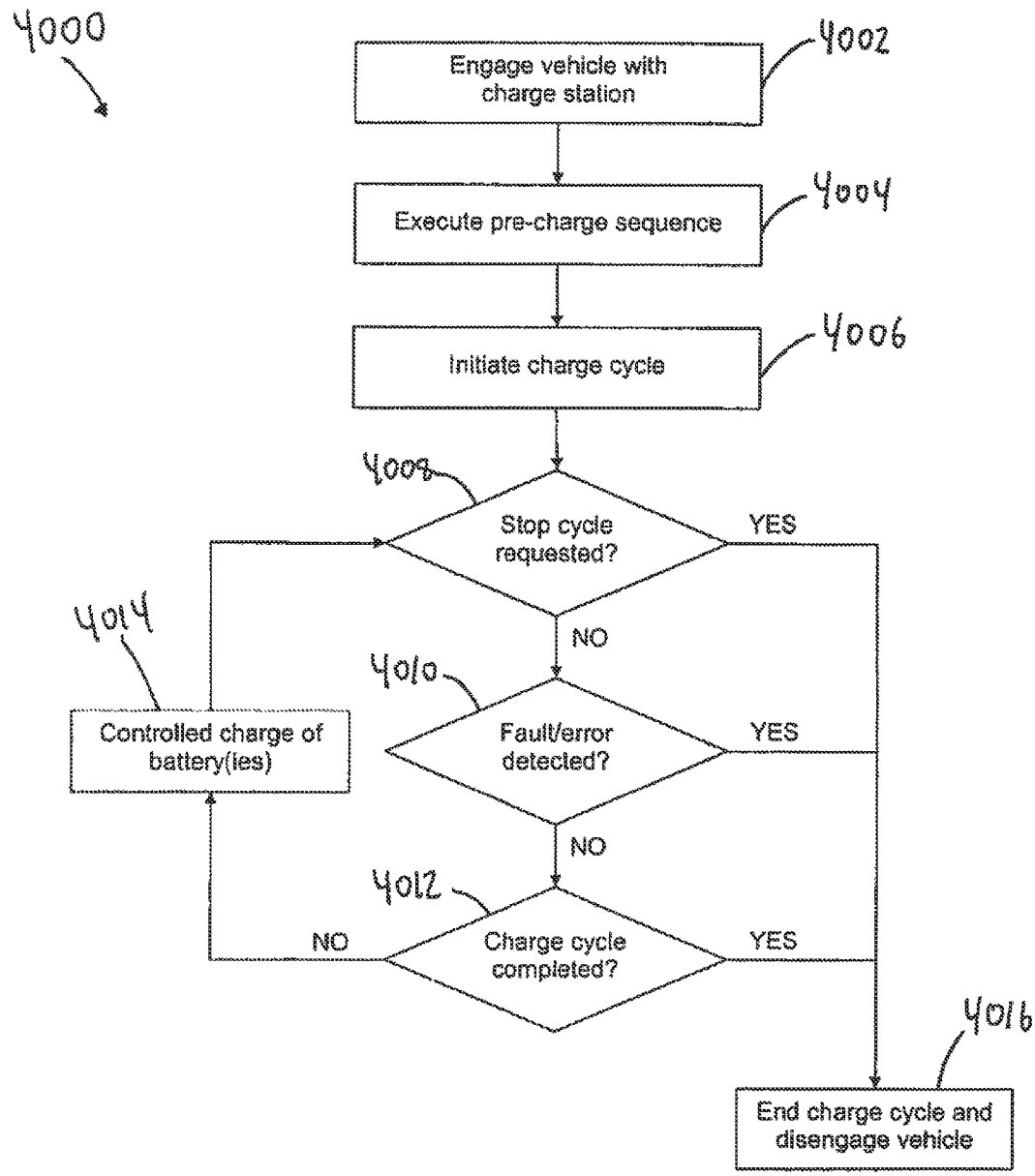
FIG. 4-9 are process flow diagrams showing an embodiment of a method of charging an energy storage device installed on a transit vehicle through a charge cycle in accordance with the invention.

Accordingly, FIG. 4 shows an embodiment of an overall charge process or method 4000 for energy storage device(s) 200 in accordance with the invention. As described herein, method 4000 may be utilized to charge the onboard storage devices of an electric transit vehicle, from engagement of an energy storage system 900, such as might be installed on a transit bus having, e.g., a charge control system 100, to a power supply 500 as described herein, to disengagement of the transit vehicle or energy storage system 900 at the end of a charge cycle. Various steps shown in FIG. 4 as discrete blocks are explained and elaborated on in more detail below, with reference to suitable examples and further explanation of such aspects of the embodiments.

Figure 5:
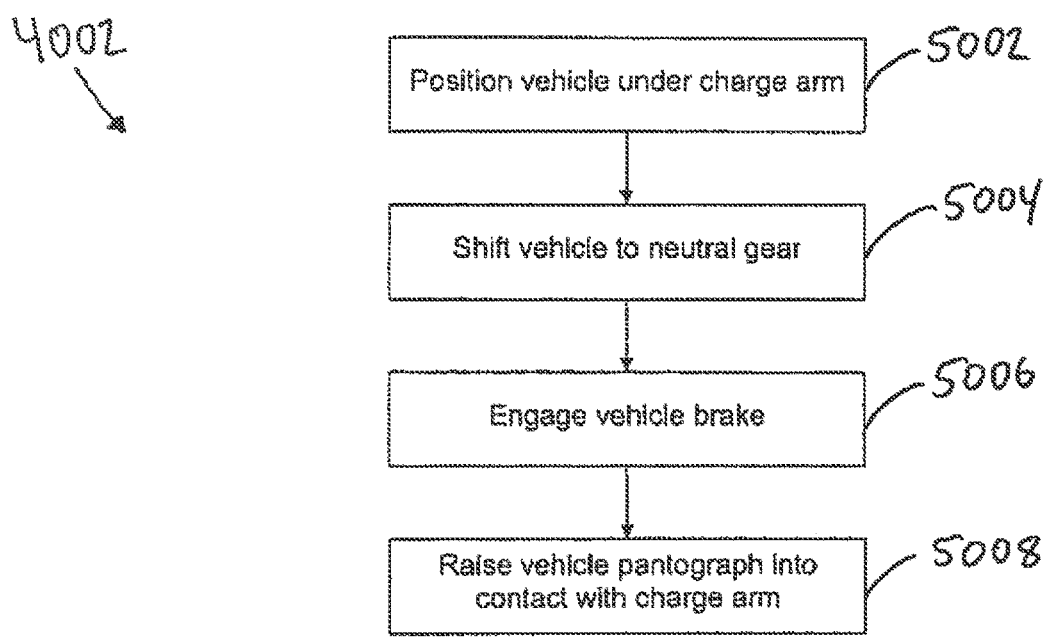
Figure 6:
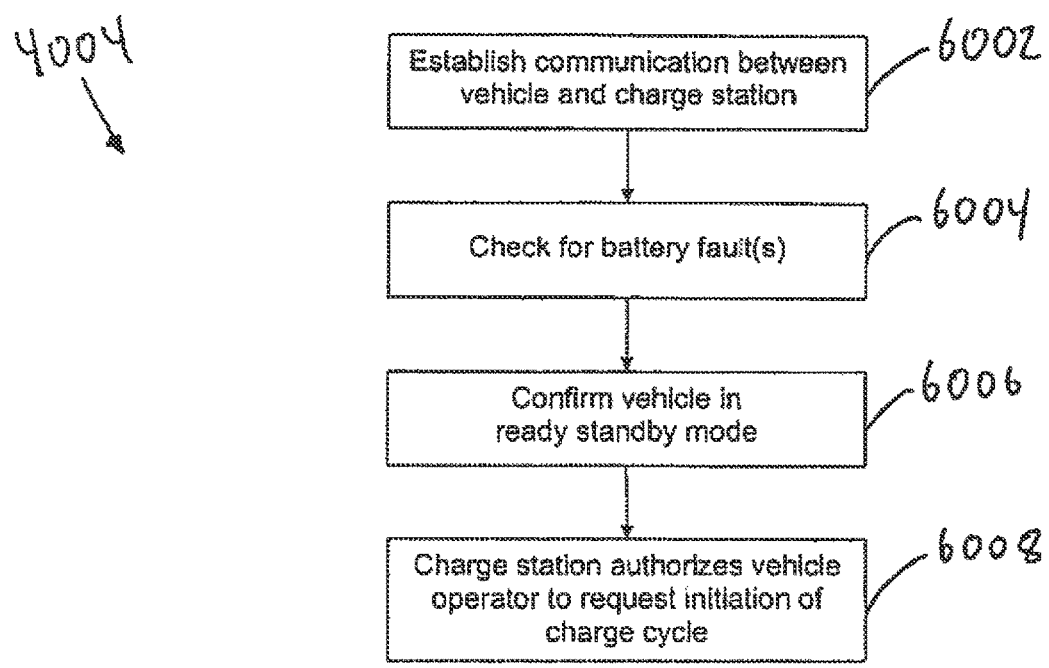

At 4002 in FIG. 4, an energy storage system 900, such as might be installed onboard an electric transit bus or other wholly- or partially electric vehicle, comprising a charge control system 100 and load(s) 800, is engaged with a charge station. In some embodiments, such charge station may comprise, for example, a power supply 500, as depicted in FIG. 2 in accordance with the invention. An example of an engagement process 4002 is shown in FIG. 5 with reference also to FIGS. 10A and 10B.

Figure 10A:
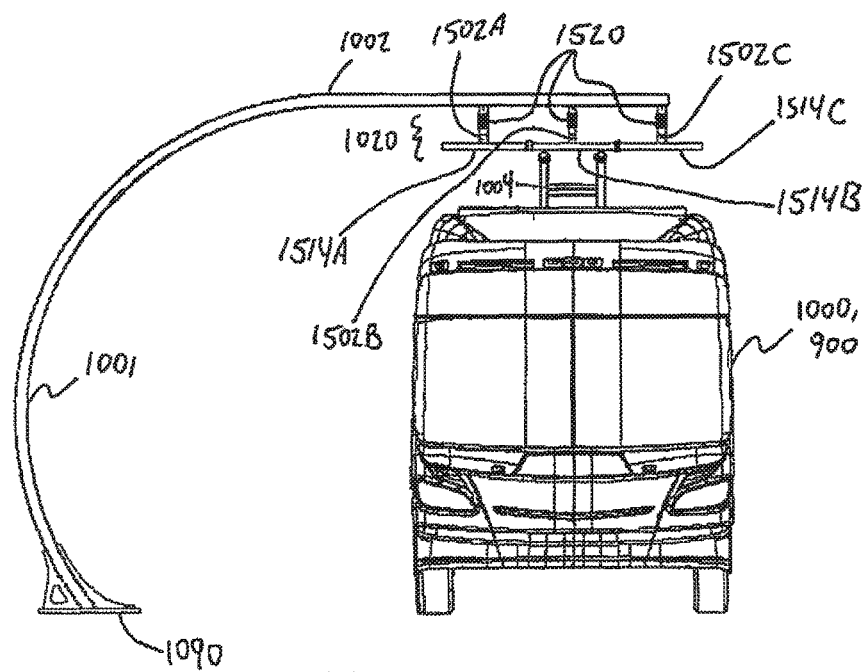
Figure 10B:
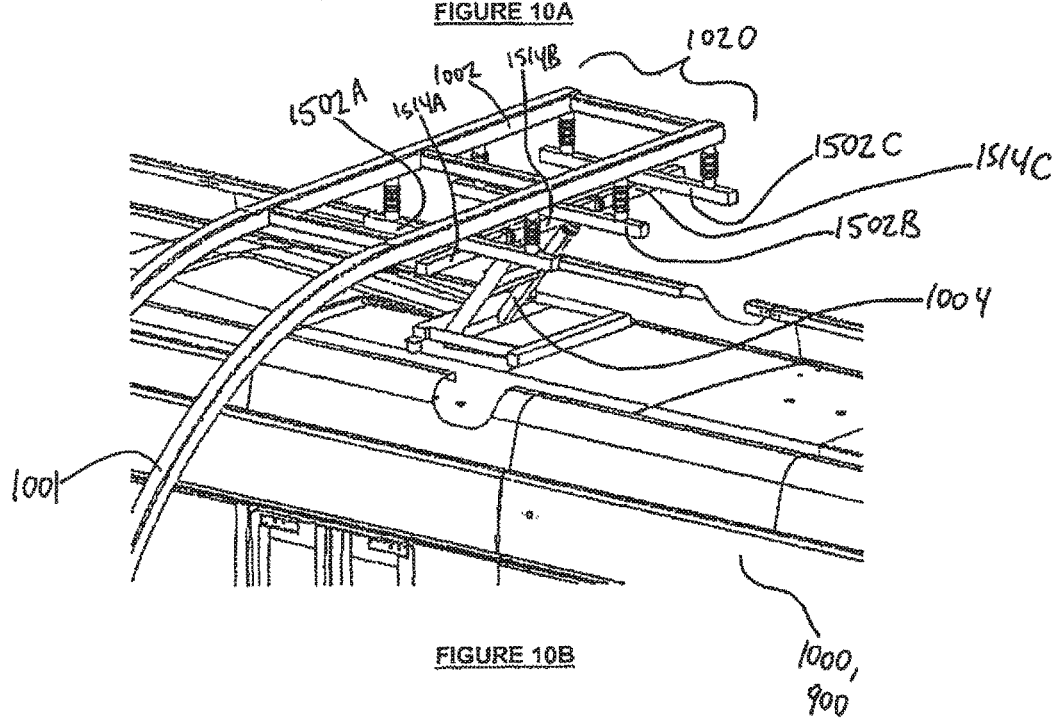

Thus, for example, as shown in FIGS. 10A and 10B, a transit bus 1000 comprising an energy storage system 900 is shown in releasable engagement with an interface 1002 of a power supply 500 (not shown) at a vehicle charge station 1001. To effect engagement of the transit bus 1000 with the interface 1002, for example, at 5002 in FIG. 6, the bus 1000 is positioned generally beneath the interface arm 1002, as for example by being driven there by a driver of the bus, so that an electrical or electromechanical connection on the bus 1000 is generally aligned with a corresponding electrical or electromechanical connection on the interface arm 1002. At 5004, the driver of the bus 1000 can place the vehicle into a neutral gear, such as a park gear and, at 5006, the driver may engage a brake or other parking device to ensure positional stability of the vehicle 1000 against any form of forward, lateral or reverse movement. In some cases, the onboard charge control system of the bus 1000 may be configured so that formation of a mechanical and/or electrical connection to the interface arm 1002 is disabled until the bus has been verified to have been placed into a neutral gear and with the parking brake engaged, thus ensuring that the vehicle does not inadvertently drive forward and/or disengage from the interface 1002 while the connection is hot.

At 5008, switches, contacts, or other electrical connection(s) 154 installed on the bus 1000 may be brought into mechanical contact with the corresponding connection of the interface arm 1002, e.g., power supply lines 152 of the power supply 500 (FIG. 2). For example, in some cases, bus 1000 may be equipped with an upwardly movable or extendible electrical connection, such as a pantograph 1004 installed on top of the bus 1000, which may be extended or raised on command. The raising of such a pantograph may be controllable, as for example through the use of any suitable proximity- and/or position-sensing device(s) such as suitably-configured optical, near-field communications (NFC), navigational satellite, radio-frequency, and/or other devices, coupled with suitably-configured control apparatus. While a pantograph may provide one suitable configuration of electrical connection for bus 1000, other types and/or configurations of extendible electrical connections may be suitable as well.

Raising of such a pantograph 1004 into a proper position can have the effect of placing the power supply 500 into electrical contact with the energy storage system 900, as shown for example in FIGS. 1 and 2. However, while an external electric connection to power supply 500 may be effected through closing of connection(s) 154, 550, e.g., by raising of a pantograph, in some embodiments, onboard energy storage devices 200 may remain electrically isolated from power supply 500 by way of onboard connection 156 (FIG. 1) remaining for the time being open until further control signals responsible for sequencing the closing of such onboard connection are exchanged.

In some embodiments, pantograph 1004 may be provided with three or more rail/vehicle contact segments in a single pantograph system, as shown for example at 1020 in FIGS. 10A and 10B. Thus, three supply-side contact components 1502A, 1502B, 1502C may be brought into contact with three corresponding storage-side connections 1514A, 1514B, 1514C. Each of the three segments on each side of the connection may be separated from the others by suitably-configured insulators 1520. In some embodiments, any one or more of the three or more contacts 1502-1514 can comprise a connection to a ground 1090 having sufficient capacity to ground an entire charge current delivered to the transmit bus 1000. Thus, as each individual connection can maintain the full magnitude of the charge current, such configuration introduces redundancy that reduces the alignment precision required to make a solid electrical connection between bus 1000 and interface arm 1002, e.g., because any single connection may generally suffice. Thus, generally more difficult or complex alignment between bus 1000 and arm 1002 may not be necessary. As will be appreciated by those skilled in the relevant arts, provision of such a full- or substantially full-load ground can result in significant improvements in safety and efficiency.

It will further be understood that any desired or otherwise advantageous numbers of contact segments 1502, 1514 can be provided in an interface 1004.

With contact established and a power supply 500 electrically coupled to the charge control system 100 and/or other desired portions of the energy storage system 900, at 4004, any desired pre-charge sequence(s) can be initiated. For example, such pre-charge sequence(s) may be useful for detecting the existence of battery and/or other electrical faults on either bus 1000 or power supply 500, and for verifying that communication between bus 1000 (e.g., charge control system 100) and power supply 500 is operational and functioning as expected. An example of a suitable pre-charge sequence 4004 that can be executed is shown in more detail in FIG. 6.

Thus, for example, at 6002, signal communication between charge controller 400 installed on bus 1000 and master controller 570 of power supply 500 may be established by means of communications subsystems 450, 508 exchanging a specified message protocol. For example, a heartbeat process comprising an exchange of messages or pings between controllers 400, 570 can be used to verify the availability and proper functioning of communications. Other system data and/or parameters may also be exchanged as the case may be.

At 6004, battery and/or other system faults can be checked, and any appropriate remedial action(s) taken, for example, to prevent short circuits, battery overheating, etc.

At 6006, it can be confirmed that the energy storage system 900 is in a physical condition for charging to occur. For example, in an embodiment comprising a bus, a suitable circuit may be checked to confirm that the bus is in neutral, park, or other standby mode, to ensure for example that applying a charge current will not cause the bus to drive forward or backward unintentionally.

At 6008, upon completion of these and/or any other desired checks, the power supply 500, the charge station 1002, and/or other responsible or desired authority may confirm to charge control system 100 that charging is authorized by sending an appropriate message. Upon receipt of such message, control system 100 may enter into a state whereby it is ready to receive input of a request to initiate a charge cycle. Additionally, in some embodiments, charge control system 100 may upon receipt of the charge ready signal from power supply 500 provide corresponding indication to the driver or other energy storage system operator, for example, by means of a warning light, display, audio alarm, and/or other means, which indicates to the drive that the system is ready to begin charging. Optionally, such authorizations and initiations may be made semi- or fully-automatically by the controllers 400, 570, etc.

With any required or otherwise desired pre-charge checks and confirmations complete and charging authorized, at 4006, initiation of a charge cycle may be requested.

Figure 7:
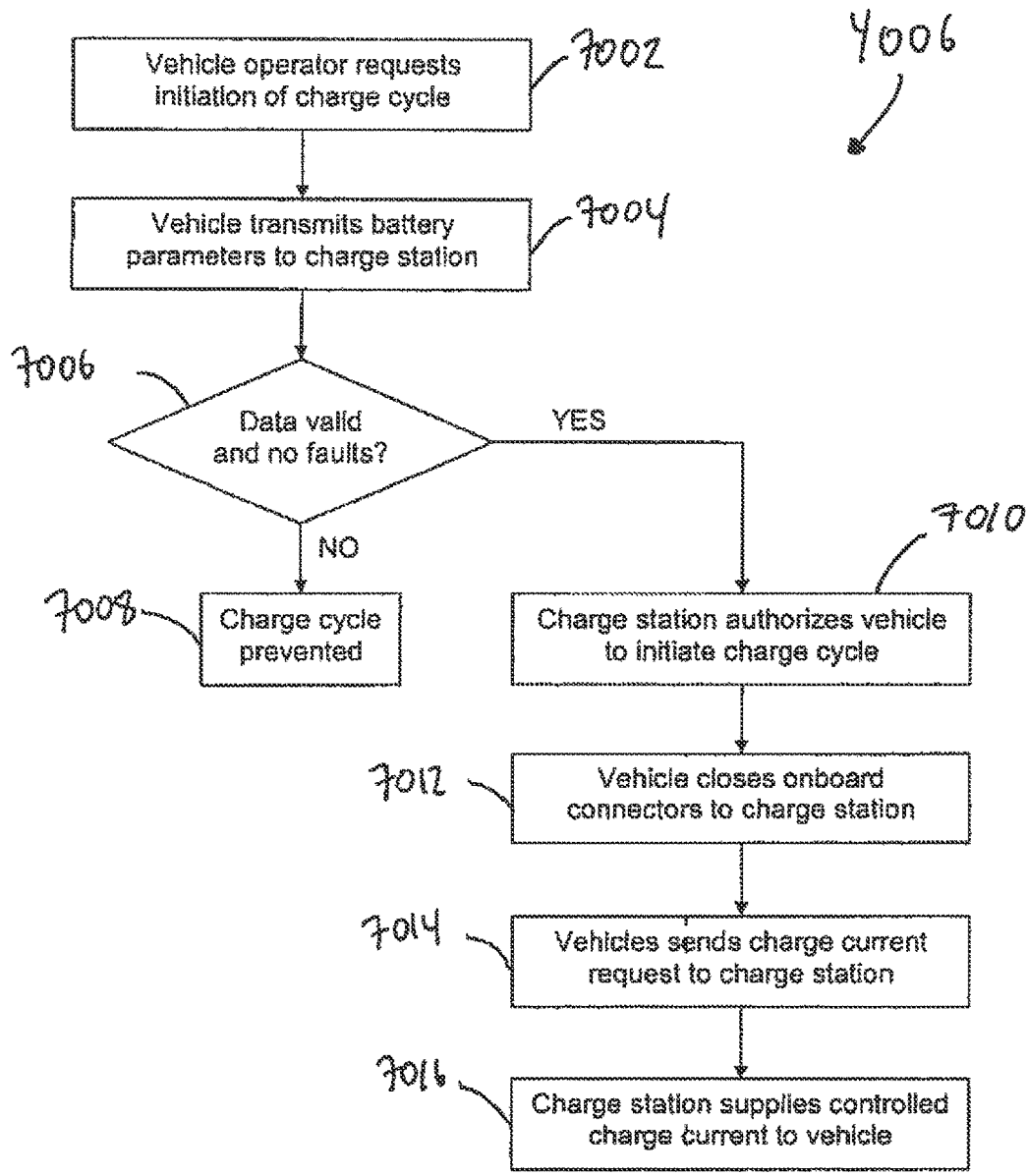

For example, as shown in FIG. 7, at 7002, a human vehicle operator and/or one or more automatic controllers 400, 570, etc., can generate a suitably-configured instruction signal and thereby request commencement of the charge cycle. For example, by pressing a suitably-configured button, throwing a switch, or entering a suitable keyboard command, an operator of a bus may cause an initiation command signal to be sent to an onboard charge controller 400.

Such a command signal can, for example, cause the charge controller 400 to check the charge and/or other state(s) of one or more of a plurality of batteries or other energy storage devices 200, as shown in FIG. 1, to generate signals representing relevant state parameters, and to route them to a power supply master control 570. For example, the transmitted parameters may include a maximum allowed voltage that the power supply 500 can reach (different storage devices 200 may have different allowed maximums depending on size, configuration, etc.), as well as a minimum target voltage that the power supply 500 must reach before a charging connection attempt may be permitted.

At 7006, the controller 400 and/or master control 570 can check to determine whether any batteries or other energy storage devices 200 are in a fault condition. If a sufficient number of batteries are in fault and cannot be isolated, then at 7008 a requested charge cycle can be prevented. Power supply 500 may also check to verify that the minimum target and maximum voltage requirements transmitted by the charge controller 400 can be met.

Upon confirmation at 7006 that neither controller 570, 400, etc., determines that any fault condition exists based on the state parameters generated at 2004, at 7010 the master controller 570 and/or other authorized controller can confirm that it is not in a fault condition and provide authorization to the charge system 100 to commence charging.

At 7012, the energy storage system 900/charge controller 400 can confirm that its circuits are in a proper state for charging, including for example in the case of a bus or other vehicle, closing onboard connection 156 and/or otherwise establishing connections to the charge station 1001 and/or power supply 500. With closing of onboard connection 156, both the plurality of energy storage devices 200 and charge controller 400 may now be electrically connected to power supply 500.

At 7014, with suitable connections established, the charge controller 400 can send a suitably-configured current request, for example a suitable command signal, to the charge station 1001 and/or power supply 500. As described herein, such current request may be transmitted to power supply 400 by communication subsystem 450 modulating the charge current on power supply line 150 in response to suitable command signals generated by charge controller 400, and the magnitude of the requested current may reflect individual currents requested by individual storage devices 200 aggregated together into a total current request by charge controller 400.

At 7016, the charge station 1001/master control 570 can confirm that its converter(s) 520 and/or other relevant components are in proper state(s), and can close connection(s) 510, etc., and cause requested charge current(s) to be sent to batteries and/or other energy storage device(s) 200 through output regulation of converter(s) 520.

With contact established between power supply 500 and charge system 100, and with a charge cycle initiated through delivery of current to the supply line(s) 150, at 4008 in FIG. 4, a process of monitoring one or more states of the charge process can be initiated, for example, by one or both of controllers 400, 570 implementing one or more loops to check whether any conditions such as fault, termination request, or charge-complete exist, and if so terminating the charging cycle. For example, any fault, disconnect, charge-complete, or other condition or state can cause any one or more of controller(s) 400, 570, etc., or an operator of a system 900 to terminate the charge cycle by generating and issuing a suitable instruction command signal.

Figure 8:
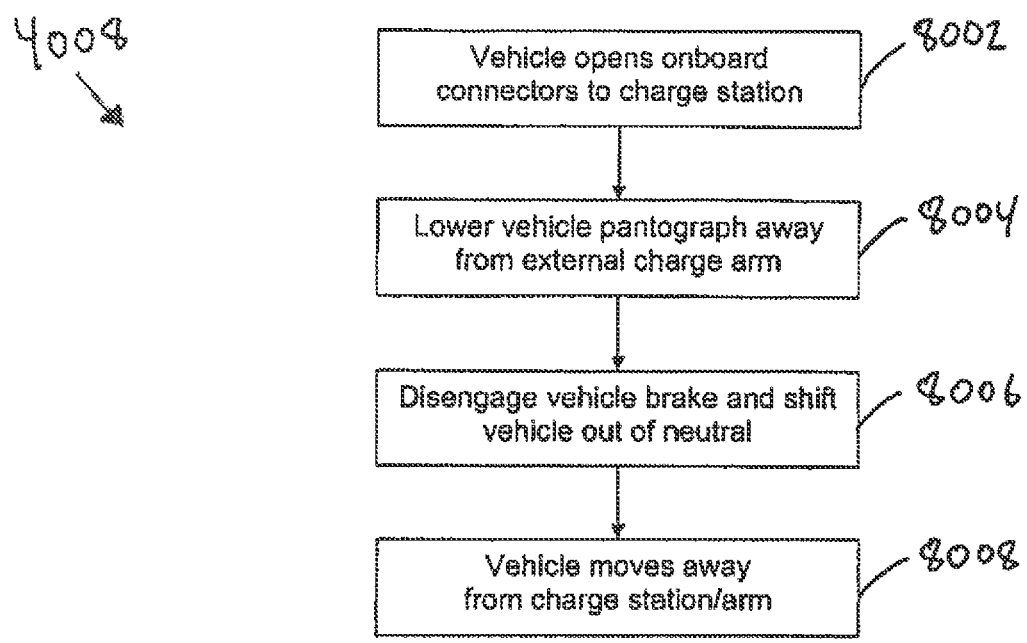

If at 4008 it is determined for any reason that charging should be terminated, at 4016 the charge cycle can be ended. For example, as shown in FIG. 8, at 8002, the energy storage system 900 and/or charge controller 400 can generate and issue commands suitable for placing its circuits in a proper state for charge cycle termination, including for example in the case of a bus or other vehicle, opening any desired switches or connections 154, 156, 510, 550, etc., and/or otherwise terminating connections to the charge station 1001 and/or power supply 500. For example, any suitable switches, contacts, or other onboard electrical connection(s) 156 installed on the bus 1000 may be opened, or removed from contact with power supply lines 152, 514 of the power supply 500, as well as any external connections to power supply 500, as for example may be effected by lowering of a pantograph 1004 installed on top of the bus 1000. Lowering of such a pantograph may be fully or semi-automatic, as appropriate or desired.

In the case of a bus or other transit vehicle, at 8008 the operator of the vehicle can, for example, disengage the brake and put the vehicle into a drive state, as for example by placing into a drive gear; and at 8010, subject to any warnings or alerts from the charge station, etc., the vehicle can move away from the charge station and resume or begin operations.

In the embodiment shown in FIG. 4, the process of charge-state monitoring can begin at 4008 with a determination whether a command signal representing a request to terminate charging has been received by a responsible controller 400, 570 from any authorized requester. For example, an operator of a transit bus can take any of a wide range of actions indicating that the operator wishes to resume transit operations. For example, the driver can shift the vehicle out of neutral, can remove his/her foot from the brake, etc., indicating that the bus is preparing to move; and/or he/she can activate a switch, button, or other apparatus to generate a stop charge request. If such a command has been generated, at 4016, end charge-cycle operations can commence, as for example described above in connection with FIG. 8.

If no request to terminate the charge cycle has been received by a responsible controller, at 4010 a determination can be made as to whether any fault or error condition has been detected which could prompt termination of the charge cycle. Such determinations can, for example, be made by any or all controllers 400, 570, etc., and can include determinations as to whether any electrical fault in any battery 200 or other circuit component, high-temperature indications, voltage or current surge or fluctuation, battery overvoltage and/or under-voltage conditions, etc. If such a fault has been determined to exist, at 4016, end charge-cycle operations can commence, as for example described above in connection with FIG. 8.

Optionally, in such case, any suitable warnings may be generated, to a driver or other operator of a vehicle, and/or to a controller at a remote base station by telemetric or other means.

If no fault condition has been detected, as part of the monitoring process, at 4012, a determination may be made by any or all responsible controllers 400, 570, etc., as to whether a desired charge state has been reached, e.g., which could indicate that a desired charge cycle has been completed. If a desired charge state has been reached, at 4016, end charge-cycle operations can commence, as for example described above in connection with FIG. 8.

Figure 9:
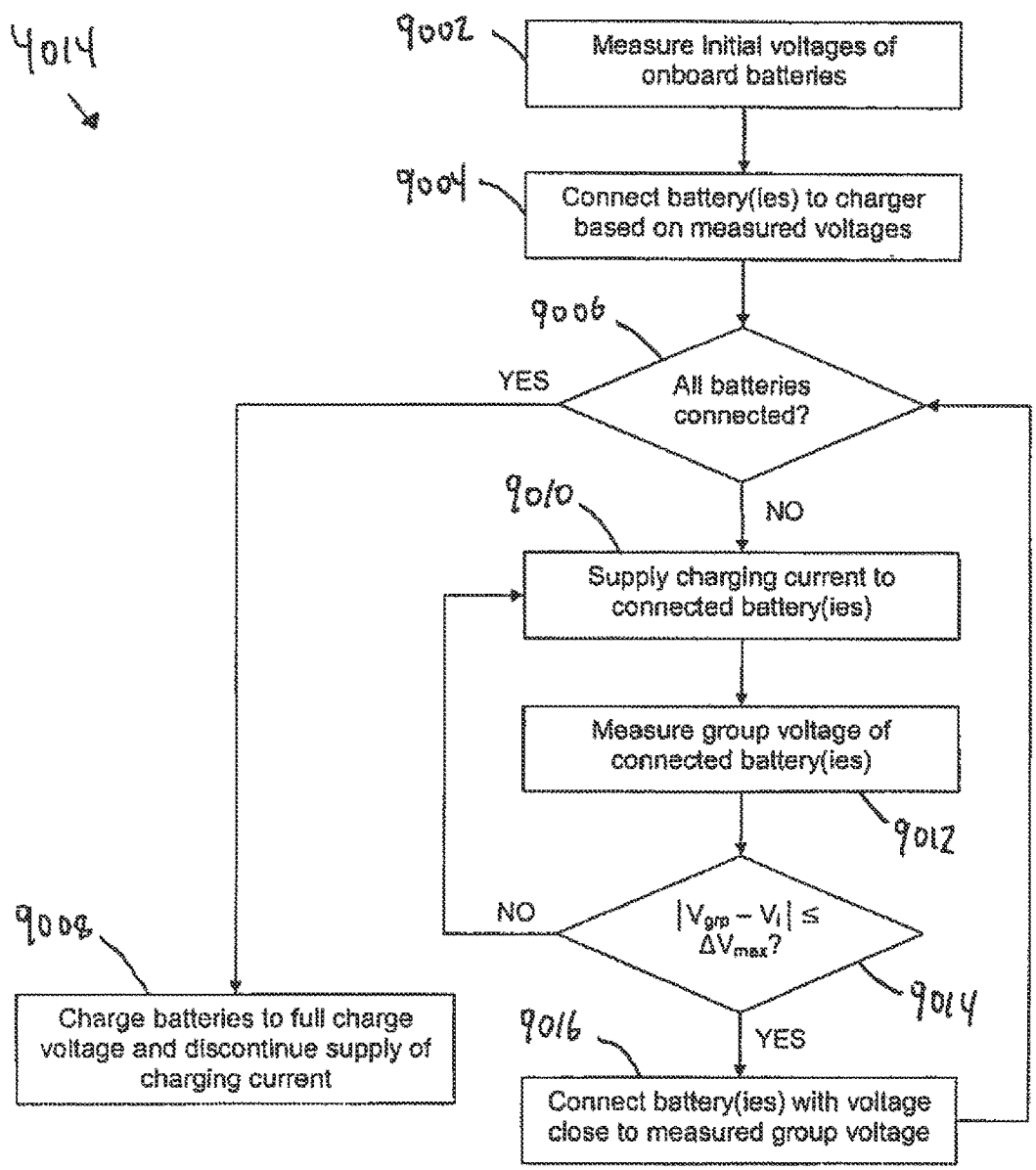

If no determinations made at 4008, 4010, 4012, indicate that the charge cycle should be terminated, at 4014, controlled charge processes may be initiated, continued or otherwise implemented. For example, as shown in FIG. 9, at 9002 either or both of current/initial voltage(s) and current(s) present in a plurality of batteries or other energy storage devices 200 of a bus 1000 or other energy storage system 900 can be measured, and signals representing corresponding state data can be provided to either or both of controllers 400, 570 via communications subsystems 450, 508, etc., for continual assessment and control of charging processes.

Based on voltages and/or currents measured at 9002, at 9004 one or more batteries 200, or groupings of batteries, of a plurality 220 of batteries 200 may be connected to power lines 150, which may be electrically coupled to power lines 502 by means of switches 156, 550. Which battery(ies) 200, or groupings of batteries, to connect initially, as part of an initial grouping to be charged, may be determined by any suitable controller(s), including for example a charge controller 400 installed on the bus 1000.

As described herein, selections of battery(ies) to connect to power lines 502 may be made by, e.g., charge controller 400, in terms of both which battery(ies) to connect and when to make such connections, based on measured parameters, so that any given battery is connected to the power line 502 when its terminal voltage is not more than a specified maximum difference away from the group voltage of the battery(ies) currently connected to the power line 150. If no batteries are currently connected to the power line 150, such as might occur at the beginning of a charge (or discharge) cycle, selection of which battery(ies) to connect may depend on the relative voltages of each unconnected battery, such that only the lowest voltage battery(ies) having respective voltages within the maximum specified difference are connected at the same time.

For example, as shown in FIGS. 1 and 3, when no batteries are currently connected to a power supply line 150, as might be the case at the beginning of a charge (or discharge) cycle, a charge controller 400 can connect an initial grouping comprising one of more of the energy storage devices 200 to a power supply line 150. In some embodiments, the initial grouping may comprise one or more energy storage devices 200 determined to have respective voltages within a specified maximum difference of each other. In addition, the initial grouping of connected batteries 200 may also have minimum voltages among the plurality 220 of batteries 200 to be connected. Thus, for example, in the initial grouping, each included battery 200 may have a voltage that is not more than the specified voltage difference away from each other battery 200 in the initial grouping, and each battery 200 not included in the initial grouping may have a voltage that is greater than the voltage of each included battery 200 in the initial grouping.

In this way, as a charging cycle progresses and the group voltage of the batteries 200 connected to the power supply line 150 increases, at some point during the charge cycle, the group voltage of the connected batteries 200 will come to within the specified maximum difference away from the respective voltage of each other unconnected battery. Each unconnected battery not included in the initial grouping may thereby be able to be connected also to the power line 150 at a point when its respective voltage is within the maximum specified difference away from the group voltage of the batteries that are currently connected to the power line 150 (whether by inclusion in the initial grouping or subsequent connection thereto). By only connecting batteries when this condition holds, as described herein, it is possible to minimize or eliminate the effects of inrush currents to the batteries.

Thus, for example, with an initial grouping of energy storage devices 200 connected to the power supply line 150, charge controller 400 may initiate an iterative process in order to connect each of the remaining energy storage devices 200 to the power line 150. Such iterative process may include, at 9006, a determination of whether all batteries are yet connected to the power supply line 150. For example, such determination may be made using a table of status flags or some equivalent data structure by which the status (connected, unconnected, faulted, etc.) of each storage device 200 may be tracked by charge controller 400.

If at 9006 it is determined that all batteries are connected to the power supply line 150, at 9008 charging can optionally continue until it is determined by a controller 400 that all batteries are fully charged, at which point control processing can continue as shown for example at 4012 in FIG. 4, for example, by charge controller 400 generating and providing to a master control 570 a command signal configured to terminate charging, as described herein. However, as alternative, the charging current may also be discontinued and the charge cycle terminated once each of the plurality 220 of batteries is connected to the power supply 150. To end the charge cycle, charge controller 400 may generated and transmit a suitably encoded signal to power supply 500 along power supply line 150 as described herein.

However, if at 9006 it is determined that not all batteries 200 are yet connected to power supply lines 150, 502, then while at 9010 the requested charging current is supplied to the connected batteries 200, at 9012, voltages (and/or currents) in the connected batteries 200 can be monitored by either or both of controllers 400, 570, and at 9014 charge controller 400 can determine whether the group voltage of the currently-connected battery(ies) 200 is within a specified maximum difference from the voltage of a grouping of unconnected batteries having the next-lowest voltage(s).

That is, for example, at 9012-9016 charge controller 400 can monitor the group voltage of the one or more energy storage devices 200 currently connected to the power supply line 150, 502, and determine when to connect each respective next grouping of the energy storage devices 200 to the power supply line 150, 502 based on comparison, e.g., at 9014, of the monitored group voltage and the measured initial voltage(s) of the energy storage device(s) in the respective next grouping.

Thus, following such iterative process, charge controller 400 may select one or more next groupings of the energy storage devices for connection to the power supply line 150, based on their initiated voltages and by continual or semi-continual monitoring of the increasing group voltage of the connected batteries 200 during charging. Each such next grouping may include one or more energy storage devices 200 not yet connected to the power supply line 150 that charge controller 400 determines to have respective voltages within the specified maximum difference of each other. For example, to make this determination, charge controller 400 may take voltage measurements of each unconnected battery and compare the measured values with one another. This iterative process may be repeated until each of the plurality of energy storage devices 200 is connected the power supply line 150.

Determinations of which battery(ies) 200 to connect to power supply line(s) 150, 502 may be made in accordance with any of a wide variety of suitable criteria. For example, for charging of an energy storage device 900 which is in operation, such as an industrial drill, lathe, or other tool, battery(ies) 200 or groupings thereof may be selected based on highest current output. For an energy storage device 900 such as a battery system on a parked bus 1000, battery(ies) 200 or groupings thereof may be selected based on having a lowest voltage charge state.

As will be appreciated by those skilled in the relevant arts, the specified maximum voltage (and/or current) difference(s) used as reference(s) by the responsible controller(s) 400 at 9014 may depend upon a number of factors, including for example the chemical and physical characteristics of the battery(ies) 200 to be charged, and the voltage and level of the current(s) applied by power supply line(s) 150, 502.

Thus, in various aspects, embodiments of the invention may provide a method of charging pluralities of energy storage devices 200, comprising: connecting an initial grouping of the energy storage devices 200 to a power supply line 150, 502, the initial grouping comprising one or more energy storage devices 200 determined to have respective voltages within a specified maximum difference of each other; supplying a charging current to the power supply line 150, 502; connecting a remainder of the energy storage devices 200 not included in the initial grouping to the power supply line 150, 502 by, for each respective energy storage device 200 in the remainder, connecting the respective energy storage device(s) 200 to the power supply line 150, 502 when a determination 9014 is made that a group voltage of the one or more energy storage devices 200 currently connected to the power supply line 150, 502 and the voltage of the respective energy storage device(s) 200 in the remainder are within a specified maximum difference of each other; and discontinuing supply of the charging current to the power supply line when it is determined that the plurality of energy storage devices 200 is charged to a specified full charge voltage.

Among the many advantages provided by the invention is the modulation, by either or both of master controller(s) 570 and charge controller(s) 400 of charge currents provided, for example, in power supply lines 150, 502, in such way that the modulated charge currents carry command/control signals that can be used by the controllers 570, 400 in communicating with each other and controlling charge processes described herein, including described in connection with processes 4000-4014', etc., of FIGS. 4-9.

Thus, for example, embodiments of the invention provide methods of charging energy storage devices 200 through the use of charge currents comprising both DC and AC components, where the DC component corresponds to a charging current applied to the one or more energy storage devices 200 by a power supply 500 in response to control signals (e.g., charge current requests) generated by a charge controller 400; and the AC component corresponds to modulations of the charge current generated by, or under the control of, a controller 570, 400 and represents control signals transmitted over the power supply line 150, 502.

As will be appreciated by those skilled in the relevant arts, once they have been made familiar with this disclosure, the use of such modulations to carry control signals can provide significant advantages in the efficiency and effectiveness of charging processes.

As previously noted, and as will be understood by those skilled in the relevant arts, once they have been made familiar with this disclosure, various processes and principles described above can be applied to the drawing of power from, as well as the charging of, groups of batteries or other energy storage device(s) 200. Such methods of drawing power from energy storage device(s) 200 may be similar, in certain respects, to methods described herein of charging energy storage device(s) 200, with the difference that the energy storage device(s) 200 may be connected to a power line during discharge as opposed to charging. Thus, to control the timing of connections to the power line, the voltage of the energy storage device(s) 200 may generally be decreasing as opposed to increasing. However, the timing of connections may still be controlled so as to mitigate or eliminate the presence of inrush current.

For example, as described herein, embodiments of the invention provide methods which include connecting one or more loads 800 to a first grouping of a plurality of energy storage devices 200, each grouping comprising one or more energy storage devices 200 currently connected to a power supply line 150, 152; selecting one or more energy storage devices 200 for connection to the power supply line 150, 152 from a second grouping of the energy storage devices comprising one or more energy storage devices 200 not currently connected to the power supply line 150, 152; and connecting the selected energy storage device(s) to the power supply line when it is determined that a group voltage of the one or more energy storage devices in the first grouping and the voltage of the energy storage device selected from the second grouping are within a specified maximum difference of each other.

Thus, for example, embodiments of the invention further provide a method of drawing power from pluralities of energy storage devices 200, comprising: connecting an initial grouping of the energy storage devices to a power supply line 150, 152 connected to one or more loads 800, the initial grouping comprising one or more energy storage devices 200 determined to have respective voltages within a specified maximum difference of each other; until each of the plurality of energy storage devices is connected to the power supply line, iteratively: drawing power from the initial grouping of the energy storage devices 200 to provide a power current supplied to the load(s) 800; selecting a next grouping of the energy storage devices 200 for connection to the power supply line 150, 152 and load 800, the next grouping comprising one or more energy storage devices 200 not yet connected to the power supply line 150, 152 determined to have respective voltages within the specified maximum difference of each other; and connecting the next grouping of the energy storage devices to the power supply line 150, 152 when it is determined that a group voltage of the one or more energy storage devices 200 in the first grouping currently connected to the power supply line and the voltage of a respective energy storage device in the next grouping, for each energy storage device in the next grouping, are within the specified maximum difference of each other; and optionally discontinuing supply of the power current to the load(s) when it is determined that the plurality of energy storage devices are drawn down to a specified minimum charge state.

As a further example, embodiments of the invention provide methods of drawing power from pluralities of energy storage devices 200, the methods including connecting an initial grouping of the energy storage devices 200 to a power supply line 150, 152, the initial grouping comprising one or more energy storage devices 200 determined to have respective voltages within a specified maximum difference of each other; supplying a load current to the power supply line 150, 152 for one or more loads 800; connecting a remainder of the energy storage devices 200 not included in the initial grouping to the power supply line 150, 152 by, for each respective energy storage device in the remainder, connecting the respective energy storage device 200 to the power supply line 150, 152 when it is determined that a group voltage of the one or more energy storage devices 200 currently connected to the power supply line 150, 152 and the voltage of the respective energy storage device(s) in the remainder are within a specified maximum difference of each other; and optionally discontinuing supply of the power current to the power supply line 150, 152 when it is determined that the plurality of energy storage devices 200 is depleted to a specified charge state.

In any or all of such aspects of the invention, the one or more energy storage devices 200 in one or more of the first and second groupings (and any subsequent groupings) can be connected in parallel to the power supply line 150, 152; and subsequently-connected energy storage devices 200 such as those in the second groupings can be selected on the basis of having a lowest voltage (in the case of charging processes) or highest voltage (in the case of power draw processes) among the one or more energy storage devices 200.

Thus, such methods can comprise measuring one or more voltages associated with energy storage device(s) 200 of the second grouping; determining the lowest voltage energy device 200 in the second grouping based on comparison of the measured voltages; and optionally determining when to connect the selected energy storage device(s) 200 from the second grouping to the power supply line 150, 152 based on comparison of the monitored group voltage and the measured voltage of the selected energy storage device(s) 200.

Similarly, such methods can comprise measuring one or more voltages associated with energy storage device(s) 200 of the second grouping; determining the highest voltage energy device 200 in the second grouping based on comparison of the measured voltages; and optionally determining when to connect the selected energy storage device 200 from the second grouping to the power supply line 150, 152 based on comparison of the monitored group voltage and the measured voltage of the selected energy storage device.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to applicable doctrines of claim construction, such as purposive construction, the doctrine of equivalents, and related doctrines.

As will be appreciated by those skilled in the relevant arts, various features of the above-described aspects and embodiments may be combined to create alternative embodiments not explicitly described, but which are specific instances of broader or more generic embodiments that have been disclosed. The disclosure herein is specifically intended to cover and embrace all suitable changes in technology.

What is claimed is:

1. A method, performed by a charge controller of a passenger bus, of charging a plurality of energy storage devices of the passenger bus, comprising:
   on engagement of a charge control system of the passenger bus with a charge station, executing a pre-charge sequence to confirm that at least one of the passenger bus and an energy storage system of the passenger bus is in a ready state for charging to occur;
   supplying a charging current to a first grouping of energy storage devices of the energy storage system;
   conditioned upon determining that a voltage of at least one energy storage device of a second grouping of energy storage devices of the energy storage system is less than a specified maximum difference greater than a group voltage of one or more energy storage devices of the first grouping, supplying a charging current to the at least one energy storage device of the second grouping; and
   upon receipt of a signal representing at least one of a charge termination command generated by an operator of the passenger bus, a fault indication, and a charge-complete condition associated with one or more of the energy storage devices, terminating supply of a charge current to at least one energy storage device of the energy storage system.

2. The method of claim 1, wherein the a plurality of the energy storage devices in the first grouping are connected in parallel to the power supply line.

3. The method of claim 2, wherein the at least one energy storage device of the second grouping is connected to the power supply line in parallel with the one or more energy storage devices in the first grouping.

4. The method of claim 1, wherein the at least one energy storage device of the second grouping has a lowest voltage among the one or more energy storage devices in the second grouping.

5. The method of claim 4, further comprising:
   measuring a voltage of each energy storage device in the second grouping; and
   determining the lowest voltage energy device in the second grouping based on comparison of the measured voltages.

6. The method of claim 5, further comprising:
   determining when to connect the selected energy storage device from the second grouping to the power supply line based on comparison of the monitored group voltage and the measured voltage of the selected energy storage device.

7. A method, performed by a charge controller of a passenger bus, of charging a plurality of energy storage devices of the passenger bus, comprising:
   on engagement of a charge control system of the passenger bus with a charge station, connecting an initial grouping of the energy storage devices to a power supply line, the initial grouping comprising one or more energy storage devices determined to have respective voltages within a specified maximum difference of each other;
   supplying the initial grouping of energy storage devices with a charging current on the power supply line;
   connecting a remainder of the energy storage devices not included in the initial grouping to the power supply line by monitoring a group voltage of the one or more energy storage devices currently connected to the power supply line while the charging current is supplied to the power supply line and, for each respective energy storage device in the remainder, connecting the respective energy storage device to the power supply line when it is determined that the monitored group voltage of the one or more energy storage devices currently connected to the power supply line and the voltage of the respective energy storage device in the remainder are within a specified maximum difference of each other; and
   upon receipt of a signal representing at least one of a charge termination command generated by an operator of the passenger bus, a faint indication, and a charge-complete condition associated with one or more of the energy storage devices, terminating supply of a charge current to at least one energy storage device of the energy storage system.

8. The method of claim 7, wherein the one or more energy storage devices in the initial grouping are connected in parallel to the power supply line.

9. The method of claim 8, wherein each respective energy storage device in the remainder is connected to the power supply line in parallel with the one or more energy storage devices currently connected to the power supply line.

10. The method of claim 7, further comprising:
    measuring an initial voltage of each of the plurality of energy storage devices; and
    determining the initial grouping of the energy storage devices based on comparison of the measured initial voltages.

11. The method of claim 10, further comprising:
    determining when to connect the remainder of the plurality of energy storage devices to the power supply line, for each respective energy storage device in the remainder, based on comparison of the monitored group voltage and the measured initial voltage of the respective energy storage device in the remainder.

12. The method of claim 1, wherein engagement of the charge control system of the passenger bus with the charge station comprises using at least one of a proximity-sensing device and a position-sensing device to align an electrical connection on the bus with an interface of the charge station.

13. The method of claim 1, wherein execution of the pre-charge sequence comprises confirming that at least one load has been disconnected from the energy storage system.

14. The method of claim 1, wherein execution of the pre-charge sequence comprises confirming that applying a charge current will not cause the passenger bus to drive forward or backward.

15. The method of claim 7, wherein engagement of the charge control system of the passenger bus with the charge station comprises using at least one of a proximity-sensing device and a position-sensing device to align an electrical connection on the bus with an interface of the charge station.

16. The method of claim 7, wherein execution of the pre-charge sequence comprises confirming that at least one load has been disconnected from the energy storage system.

17. The method of claim 7, wherein execution of the pre-charge sequence comprises confirming that applying a charge current will not cause the passenger bus to drive forward or backward.

18. A passenger bus having a charge control system comprising a plurality of energy storage devices and a charge controller, the charge controller configured to:
connect an initial grouping of the plurality of energy storage devices to a power supply line, the initial grouping comprising a plurality of energy storage devices determined to have respective voltages within a specified maximum difference of each other;
supply the initial grouping of energy storage devices with a charging current on the power supply line;
connect a plurality the energy storage devices not included in the initial grouping to the power supply line by monitoring a group voltage of the one or more energy storage devices currently connected to the power supply line while the charging current is supplied to the power supply line and, for each respective energy storage device in the remainder, connecting the respective energy storage device to the power supply line when it is determined that the monitored group voltage of the one or more energy storage devices currently connected to the power supply line and the voltage of the respective energy storage device in the remainder are within a specified maximum difference of each other; and
upon receipt of a signal representing at least one of a charge termination command generated by an operator of the passenger bus, a fault indication, and a charge-complete condition associated with one or more of the energy storage devices, terminating supply of a charge current to at least one energy storage device of the energy storage system.

19. The passenger bus of claim 18, comprising at least one of a proximity device and a location-sensing device, wherein engagement of the charge control system of the passenger bus with the charge station comprises using at least one of a proximity-sensing device and a position-sensing device to align an electrical connection on the bus with an interface of the charge station.

20. The passenger bus of claim 18, wherein connecting the initial grouping of the plurality of energy storage devices to a power supply line comprises confirming that at least one load has been disconnected from the energy storage system.

21. The passenger bus of claim 18, wherein connecting the initial grouping of the plurality of energy storage devices to a power supply line comprises confirming that applying a charge current will not cause the passenger bus to drive forward or backward.

22. The passenger bus of claim 18, wherein connecting the initial grouping of the plurality of energy storage devices to a power supply line comprises confirming that no fault condition exists in the passenger bus.

23. The passenger bus of claim 18, wherein connecting the initial grouping of the plurality of energy storage devices to a power supply line comprises confirming that no fault condition exists in the energy storage system.

24. The method of claim 1, wherein execution of the pre-charge sequence comprises confirming that no fault condition exists in the passenger bus.

25. The method of claim 1, wherein execution of the pre-charge sequence comprises confirming that no fault condition exists in the energy storage system.

* * * * *